United States Patent
Olivieri et al.

(10) Patent No.: US 11,595,459 B1
(45) Date of Patent: Feb. 28, 2023

(54) METHODS, SYSTEMS, AND DEVICES FOR PRESENTING BACKGROUND AND OVERLAY INDICIA IN A VIDEOCONFERENCE

(71) Applicant: Motorola Mobility LLC, Chicago, IL (US)

(72) Inventors: Alexandre Novaes Olivieri, Campinas (BR); Amit Kumar Agrawal, Bangalore (IN)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 17/501,790

(22) Filed: Oct. 14, 2021

(51) Int. Cl.
*H04L 65/75* (2022.01)
*H04L 65/403* (2022.01)

(52) U.S. Cl.
CPC .......... *H04L 65/764* (2022.05); *H04L 65/403* (2013.01)

(58) Field of Classification Search
CPC .............................. H04L 65/764; H04L 65/403
USPC ........................................................ 709/204
See application file for complete search history.

(56) References Cited

U.S. PATENT DOCUMENTS

| | | | |
|---|---|---|---|
| 10,819,905 B1 | 10/2020 | Liu | |
| 2005/0283475 A1* | 12/2005 | Beranek | G06F 16/3334 704/E15.044 |
| 2012/0236105 A1* | 9/2012 | Alberth | H04N 7/147 345/646 |
| 2013/0141513 A1 | 6/2013 | Setton | |
| 2014/0132699 A1 | 5/2014 | SEtton | |
| 2017/0193997 A1* | 7/2017 | Chen | G10L 13/08 |
| 2018/0096496 A1 | 4/2018 | Lobaugh | |
| 2021/0051294 A1 | 2/2021 | Roedel | |

OTHER PUBLICATIONS

Aguilar, Forget Siri—Get Your Questions Answered by Real People on Your iPhone, Aug. 8, 2014, https://ios.gadgethacks.com/, https://ios.gadgethacks.com/how-to/forget-siri-get-your-questions-answered-by-real-people-your-iphone-0156739/ (Year: 2014).*

Arezina, Live Speech Emotion Recognition, Apr. 14, 2021, medium.com, https://medium.com/nerd-for-tech/live-speech-emotion-categorization-7692933037ba (Year: 2021).*

Bouchard, Louis, "Realistic Lighting on Difference Backgrounds", Published May 8, 2021; Louis Bouchard; Viewed online at https://www.louisbouchard.ai/backgrounds-with-lighting/.

(Continued)

*Primary Examiner* — Zi Ye
(74) *Attorney, Agent, or Firm* — Philip H. Burrus, IV

(57) ABSTRACT

A conferencing system terminal device includes a communication device receiving one or more videoconference feeds depicting one or more subjects engaged in a videoconference from one or more remote electronic devices. The conferencing system terminal device includes a contextual information extraction engine extracting contextual information of the videoconference from the one or more videoconference feeds. One or more processors automatically apply overlay indicia generated from the contextual information to at least one videoconference feed during the videoconference. A display presents the at least one videoconference feed after the overlay indicia is applied.

20 Claims, 11 Drawing Sheets

(56) References Cited

OTHER PUBLICATIONS

McShane, M, "Natural Language Understanding (NLU, not NLP) in Cognitive Systems", AI Magazine, 38(4), 43-56. https://doi.org/10.1609/aimag.v38i4.2745 Published Dec. 2017.

Russell, Brandon, "Galaxy S 21 Features Wireless Support fo Samsung DeX on PC", Published Online Feb. 5, 2021 at https://www.xda-developers.com/galaxy-s21-wireless-support-samsung-dex-on-pc/.

Shrestha, Anish, "Generating Modern Art Using Generative Adversarial Network(GAN) on Spell", Publisehd Nov. 13, 2019; Towards Data Science; Viewed Online at https://towardsdatascience.com/generating-modern-arts-using-generative-adversarial-network-gan-on-spell-39f67f83c7b4.

Nguyen, Phung Hoang Joseph, "Non-Final Office Action", U.S. Appl. No. 17/501,782, filed Oct. 14, 2021; dated Nov. 9, 2022.

\* cited by examiner

METHODS, SYSTEMS, AND DEVICES FOR PRESENTING BACKGROUND AND OVERLAY INDICIA IN A VIDEOCONFERENCE

BACKGROUND

Technical Field

This disclosure relates generally to electronic devices, and more particularly to electronic devices capable of providing video conferencing features.

Background Art

Many modern electronic devices, including smartphones, tablet computers, and laptop computers, are equipped to engage in videoconferences with other electronic devices across a network. Users employ such devices to communicate with friends, family, and work colleagues. This is especially true during times of pandemic, when people work remotely rather than going to a centralized office. Participants engage videoconferencing to engage in real-time discussions and share electronic content. Videoconferencing additionally offers participants the ability to see other participants via video feeds streamed to the participating electronic devices.

During videoconferences, people sometimes select "virtual" background images in an effort to make meetings more fun and engaging. These virtual backgrounds also work to protect privacy, such as when they replace what would ordinarily be an image of a messy room behind the participant. While virtual backgrounds are interesting features available in videoconferencing software, selecting and changing them is an incredibly tedious process. A user must either resort to a boring "default" option (which still takes many keystrokes and mouse movements to select) or must hunt and search for a desired virtual background for display. It would be advantageous to have an improved methods, systems, and devices to make the presentation of background or overlay indicia during videoconferences simpler and more efficient.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
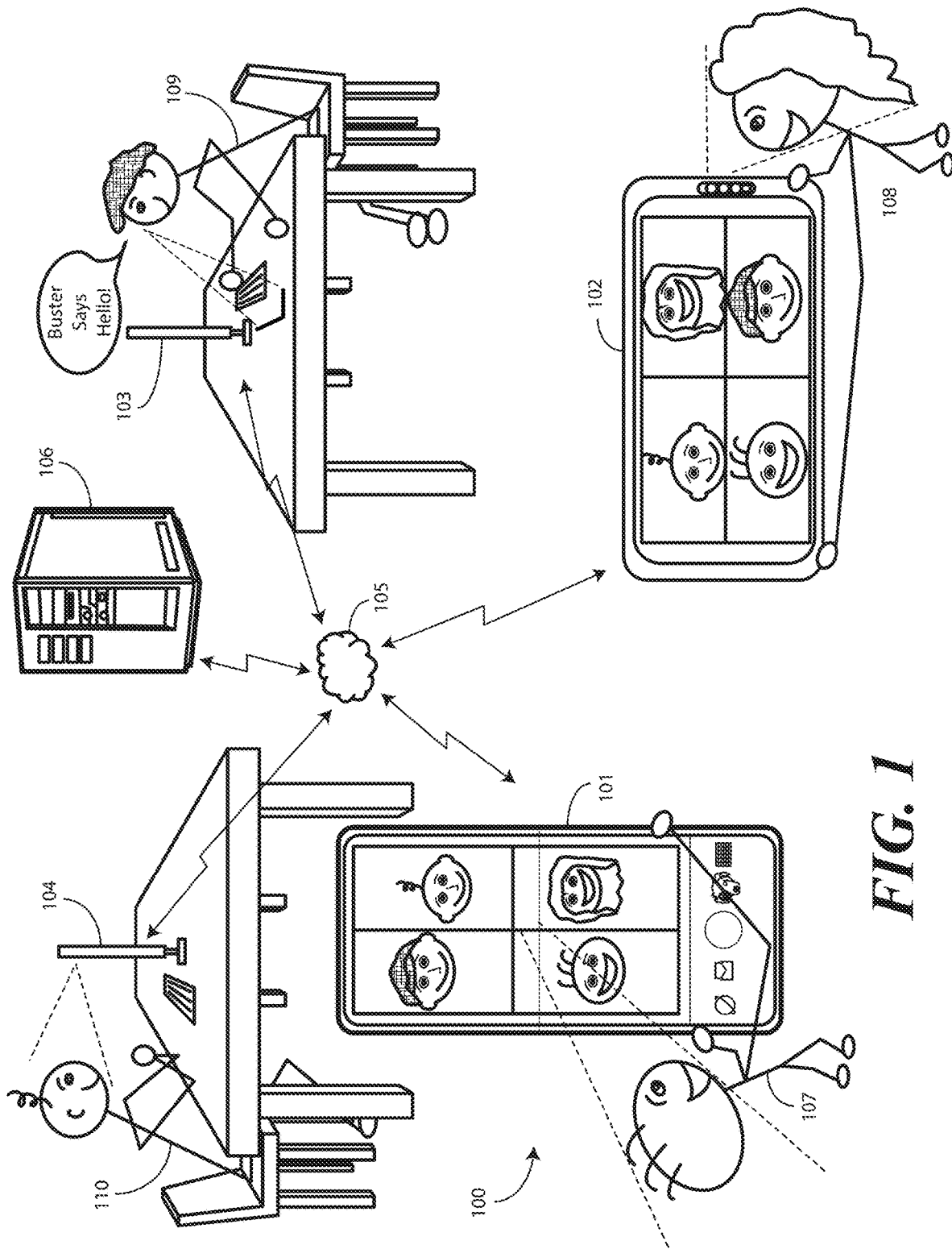
FIG. 1 illustrates one explanatory conferencing system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

BRIEF DESCRIPTION OF THE DRAWINGS

Before describing in detail embodiments that are in accordance with the present disclosure, it should be observed that the embodiments reside primarily in combinations of method steps and apparatus components related to automatically applying virtual background indicia, virtual overlay indicia, or combinations thereof in images of a videoconference as a function of contextual information detected by one or more sensors of a conferencing system terminal device engaged in the videoconference. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of applying a virtual background generated as a function of contextual information detected by one or more sensors to portions of images depicting objects other than the subject of a videoconference to create contextually background modified images of the subject and/or applying an overlay generated as a function of the contextual information to portions of the images depicting objects other than the subject to create contextually modified images of the subject, followed by one or both of transmitting the contextually background modified images across a network to another conferencing system terminal device engaged in the videoconference and/or presenting the contextually modified images of the subject on a display as described herein. The non-processor circuits may include, but are not limited to, a radio receiver, a radio transmitter, signal drivers, clock circuits, power source circuits, and user input devices. As such, these functions may be interpreted as steps of a method to perform the generation and application of an overlay as a function of contextual information associated with a participant of the videoconference and/or the generation and application of a virtual background as a function of contextual information to one or more videoconference feeds.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

In response to the COVID-19 pandemic, never before have employees worked remotely on such a massive scale. When millions of companies went fully remote in a short period of time to slow the spread of the Coronavirus Disease 2019, videoconferencing became the logical solution for connecting the remote workforce and keeping teams productive from home. In a matter of weeks, video conferencing usage exploded, permeating nearly all aspects of professional and personal life. In addition to business-related meetings, remote teams around the globe began using video conferencing to host virtual happy hours, ice breaker activities, online games, wine tastings, birthday parties, and other social activities.

These formal and informal gatherings also led to an increase in the use of virtual background images. Videoconferencing participants frequently apply these virtual background images to make meetings more fun and engaging. Illustrating by example, if you want to talk to your coworkers from the beach, the Himalayas, or even the surface of the moon, applying a "beach themed" virtual background to your videoconferencing feed allowed this to be simulated.

Even in more formal meetings, such as those held with clients, virtual backgrounds can still be useful. Rather than someone seeing your messy bedroom, the application of a virtual background image can make it appear as if you are working in a high-rise office building. Moreover, for videoconferencing participants joining a conference call from a public space, the application of a virtual background allows other videoconferencing participants to focus on the participant rather than what is actually occurring behind the participant.

The problem with traditional videoconferencing virtual backgrounds is that selecting and changing the same is a laborious and tedious process. A user must either resort to a boring "default" option (which still takes many keystrokes and mouse movements to select) or must hunt and search for a desired virtual background for display. To illustrate this difficulty, a very real case recently occurred where an attorney making a presentation before a judge via videoconference inadvertently had a cat filter actuated. The cat filter made him look, at least to other videoconference participants, like a cartoon cat. Unable to turn the filter OFF due to the laborious and tedious nature of the process mentioned above, the attorney was reduced to proceeding as a cat for quite some time.

In addition to the tedious nature of finding and selecting a background, other issues abound as well. For example, a person may want to present a background image of a wide receiver from their alma mater catching a touchdown pass from the previous Saturday's game as a virtual background. However, the image may simply not be available. Even if it is available, it may be protected by copyright and unavailable for use. If it is available for use, its image quality may not match the lighting conditions associated with the videoconference. If the person finds the wrong picture of the wide receiver, presentation of the image may not be timely if the picture was taken from another game where the alma mater lost. What's more, even if the right image is found its effect on the participant may not be flattering if her fair skin clashes with the warm colors of the uniform or the lighting in the stadium.

Embodiments of the disclosure provide a solution to this tedious process and the other issues associated with prior art virtual background systems by providing a conferencing system terminal device that includes one or more processors that automatically apply virtual background indicia in images of a videoconference behind a subject. In one or more embodiments, the one or more processors automatically apply the video background indicia as a function of contextual information detected by one or more sensors of the conferencing system terminal device. In one or more embodiments, the application of the video background indicia occurs during the videoconference and prior to a communication device of the conferencing system terminal device transmitting the images to the at least one remote electronic device engaged in the videoconference.

In one or more embodiments, in the same way video background indicia can be applied, overlay indicia can dynamically and automatically be applied to images of a videoconference as well. Illustrating by example, in one or more embodiments a communication device of a conferencing system terminal device receives one or more videoconference feeds depicting one or more subjects engaged in a videoconference from one or more remote electronic devices. A contextual information extraction engine then extracts contextual information associated with the videoconference from the one or more videoconference feeds. One or more processors of the conferencing system terminal device then apply overlay indicia generated from the contextual information to at least one videoconference feed during the videoconference. Thereafter, a display of the conferencing system terminal device then presents the at least one videoconference feed after the overlay indicia is applied.

Advantageously, by automatically applying one or both of the video background indicia and/or overlay indicia to a videoconference feed, embodiments of the disclosure automatically and dynamically create surprising, unique, appropriate, and contextually aware images for display during a videoconference. Other advantages will be described below. Still others will be obvious to those of ordinary skill in the art having the benefit of this disclosure.

In one or more embodiments, a videoconferencing system supports speech detection and audio transcription. These features could be performed in a conferencing system terminal device engaged in the videoconference or, alternatively, by a videoconferencing server complex. In one or more embodiments, one or more processors of the conferencing system terminal device or the videoconferencing server complex perform operations to extract contextual information from the transcription of the speech present in the audio feed of the videoconference. Illustrating by example, the one or more processors may detect the words "how's the weather," or "congratulations," or "happy birthday" from the transcription.

Contextual information can also be extracted from the video feed associated with the videoconference as well in one or more embodiments. Examples of such contextual information include the clothes being worn by a videoconference participant, logos or branding on such clothes, watches or jewelry worn by the participant, and so forth. Other examples of contextual information that may be extracted from the video feed include lighting conditions, a color palette associated with a particular video feed, shapes around the participant, and so forth.

In one or more embodiments, contextual information can also be extracted from external sources such as cloud servers, networked servers, other electronic devices, social media servers, and so forth. Examples of this contextual information include the time of day, the location of one or more participants engaged in the videoconference, weather information at locations of the one or more participants engaged in the videoconference, and so forth. Other examples of contextual information available from other sources includes the fact that important events such as cancer awareness month, pride parades, national holidays, and rivalry football games.

In one or more embodiments, once this contextual information is extracted and/or obtained, one or more processors of one or both of a conferencing system terminal device or a videoconference server complex use generative techniques to construct and apply one or both of real time video background indicia or real time overlay indicia to apply to the video feed of one or more participants of the videoconference. Illustrating by example, one or more processors of a conferencing system terminal device may apply a virtual background generated as a function of the contextual information to portions of the images depicting objects other than the subject to create contextually background modified images of the subject. A communication device of the conferencing system terminal device may then transmit the contextually background modified images of the subject across a network to another conferencing system terminal device engaged in the videoconference. Similarly, one or more processors of a conferencing system terminal device and/or of a videoconference server complex may apply an overlay generated as a function of the contextual information to portions of the images depicting objects other than the subject to create contextually modified images of the subject. The one or more processors can then present the contextually modified images of the subject on a display.

Accordingly, embodiments of the disclosure provide systems, methods, and devices that orchestrate the contextual information from various sources and offer a combination of automatically applied, dynamic backgrounds and overlays that create interesting and "cool" effects for everyone engaged in a videoconference. In some embodiments, one or more processors generate an overlay as a function of contextual information associated with a participant of the videoconference and apply the overlay to a videoconference feed of the participant to create a modified videoconference feed, which is delivered in video conferencing content to the plurality of conferencing system terminal devices.

In other embodiments, one or more processors generate a virtual background as a function of contextual information for one or more videoconference feeds received from one or more conferencing system terminal devices and apply the virtual background to the one or more videoconference feeds to create to create one or more modified background videoconference feeds that are delivered in the video conferencing content to the plurality of conferencing system terminal devices. Of course, a combination of these approaches could be used as well. Systems, devices, and methods for these functions are described below. As noted above, it is expected that one of ordinary skill, notwithstanding possibly significant effort and many design choices motivated by, for example, available time, current technology, and economic considerations, when guided by the concepts and principles disclosed herein will be readily capable of generating such systems, methods, and devices with minimal experimentation.

Turning now to FIG. 1, illustrated therein is one explanatory videoconference system in accordance with one or more embodiments of the disclosure. As shown, multiple participants 107, 108, 109, 110 each employ their own respective conferencing system terminal device 101, 102, 103, 104 to engage with the other participants via the videoconference. In this illustrative embodiment, conferencing system terminal devices 101, 102 are shown as smartphones, while conferencing system terminal devices 103, 104 are shown as desktop computers. However, conferencing system terminal devices suitable for use in the videoconference system can take other forms as well. For instance, tablet computers, notebook computers, audiovisual devices, mobile phones, smart watches, or other devices can be used by participants to engage in the videoconference as well. Other examples of conferencing system terminal devices will be obvious to those of ordinary skill in the art having the benefit of this disclosure.

As shown in FIG. 1, each conferencing system terminal device 101, 102, 103, 104 is engaged in wired or wireless communication with each other across a network 105, one example of which is the Internet via the World Wide Web. It should be noted that the network 105 could be a public, private, local area, wide area, or other type of network across which wired or wireless electronic communications can be exchanged.

In this illustrative embodiment, each conferencing system terminal device 101, 102, 103, 104 is also in communication with a video conferencing system server complex 106 across the network 105. As will be described in more detail with reference to FIG. 9 below, in one or more embodiments video conferencing system server complex 106 includes components such as a web server, a database server, an audio server, and optionally a video server (the video server may be omitted for audio only conferencing systems) that are operable to facilitate videoconferences between the various conferencing system terminal devices 101, 102, 103, 104 of the videoconference system.

These components of the video conferencing system server complex 106 can be combined on the same server. Alternatively, these components can be distributed on any number of servers to increase load handling capacity beyond that of a single server, and so forth. Other configurations for the video conferencing system server complex 106 will be obvious to those of ordinary skill in the art having the benefit of this disclosure.

In one or more embodiments, the video conferencing system server complex 106 performs functions such as maintaining a schedule of videoconferences, maintaining lists of participants, as well as allowing each participant's conferencing system terminal device to engage with the videoconference, and so forth. In one or more embodiments, the video conferencing system server complex 106 also facilitates the transmission of audio and video content during the occurrence of the videoconference.

In one or more embodiments, the video conferencing system server complex 106 functions as an intermediary device to facilitate sharing of audio and/or video content and/or data between the various conferencing system terminal devices 101, 102, 103, 104. For example, as can be seen on the displays of conferencing system terminal devices 101, 102, in this example each participant 107, 108, 109, 110 can see each other participant engaged in the videoconference.

In the illustrative example of FIG. 1, the participants 107, 108, 109, 110 are engaged in the videoconference. Since the participants 107, 108, 109, 110 are all engaged in a videoconference, each can see conference content in the form of a combined video feed from each other participant 107, 108, 109, 110 presented on the display of each conferencing system terminal device 101, 102, 103, 104, as well as a video feed of themselves. Under ordinary conditions, each participant 107, 108, 109, 110 can hear an audio feed from each other participant 107, 108, 109, 110 as well.

In this illustrative embodiment, participant 109 is acting as a presenter, and is speaking, noting that a friend, Buster, "says hello." The presenter's conferencing system terminal device 103 receives this audio and captures video of the presenter and transmits the same to the other conferencing system terminal devices 101, 102, 103 via the video conferencing system server complex 106. While participant 110 is the presenter at the moment, it is to be understood that the presenter role can be changed throughout the videoconference as well, with each other participant 107, 108, 110 taking the role of presenter at other times as situations warrant.

Figure 2:
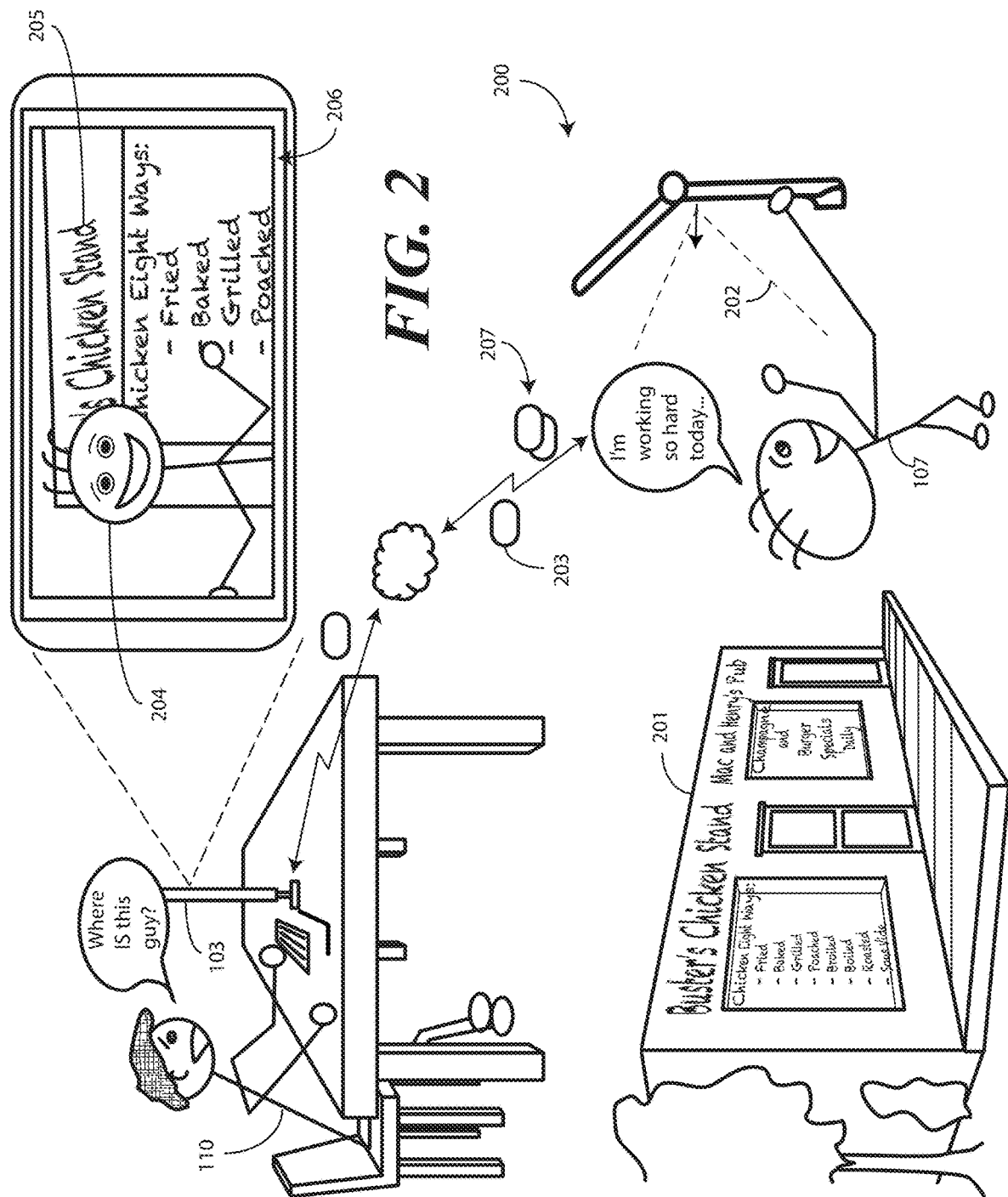
FIG. 2 illustrates portions of the conferencing system of FIG. 1 when neither video background indicia nor overlay indicia are applied to one explanatory videoconference feed.

Turning now to FIG. 2, illustrated therein is a portion 200 of the videoconference (100) of FIG. 1 illustrating an expanded view of participant 107 as he engages in the videoconference. As shown in FIG. 2, the participant 107 is on the go during work hours and, rather than being home in an office working, is instead standing in front of the legendary restaurant Buster's Chicken Stand 201, which is located next to Mac and Henry's Pub offers tasty chicken served eight different ways. The field of view 202 of the participant's conferencing system terminal device 101 is wide enough that the video feed 203 being transmitted from the conferencing system terminal device 101 includes not only an image 204 of the participant, who is the subject of the video feed 203, but also a background image 205 of Buster's Chicken Stand 201. This allows participant 109 to instantly determine by viewing the video feed 203 on his conferencing system terminal device 103 that participant 107 is not at home working but is instead enjoying some of Buster's tasty treats and probably a tipple from Mac and Henry's Pub as well. Where participant 109 is the supervisor of participant 107, this can be troublesome, to say the least.

Figure 4:
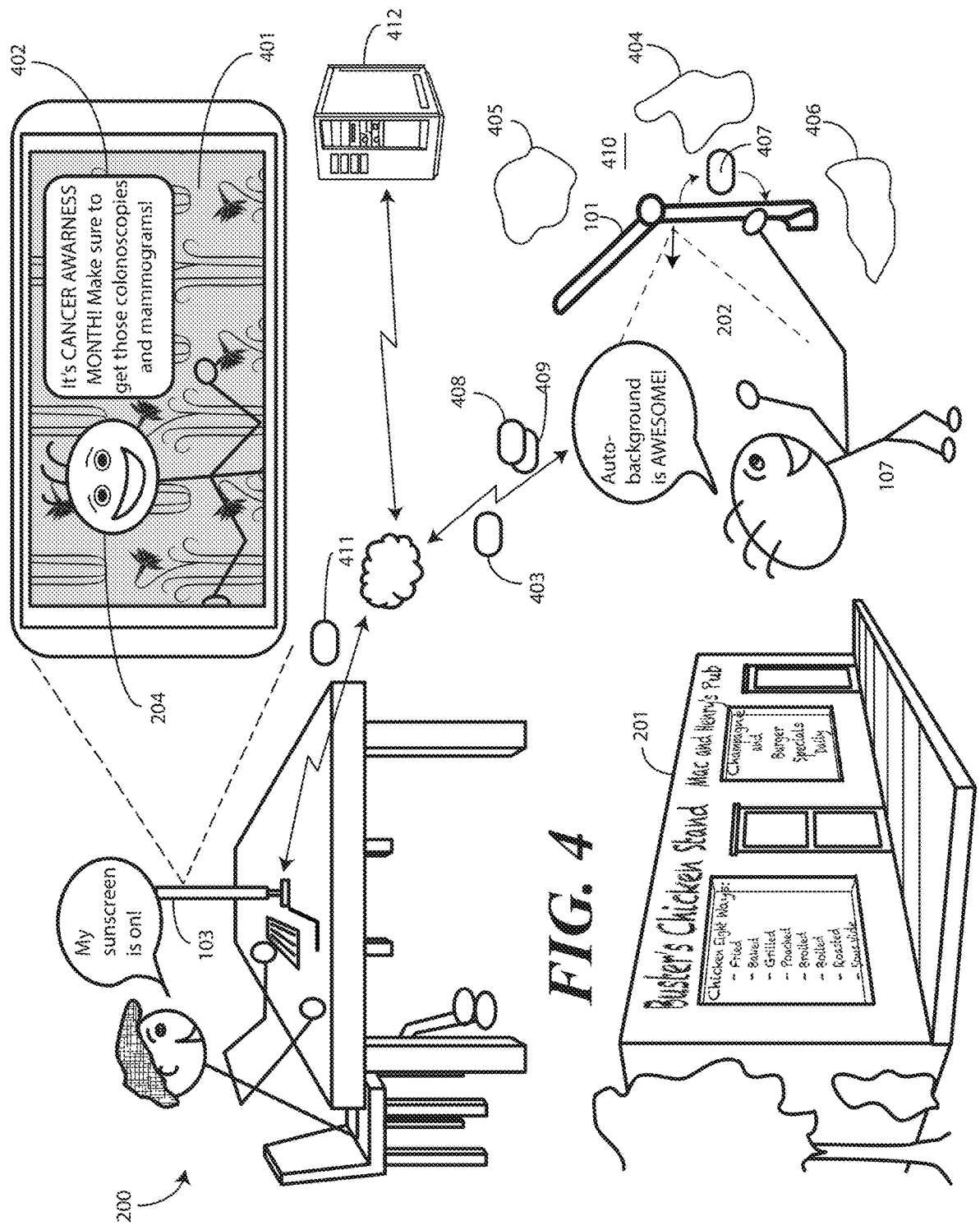
FIG. 4 illustrates portions of one explanatory conferencing system, along with one or more method steps, in accordance with one or more embodiments of the disclosure.
Figure 9:
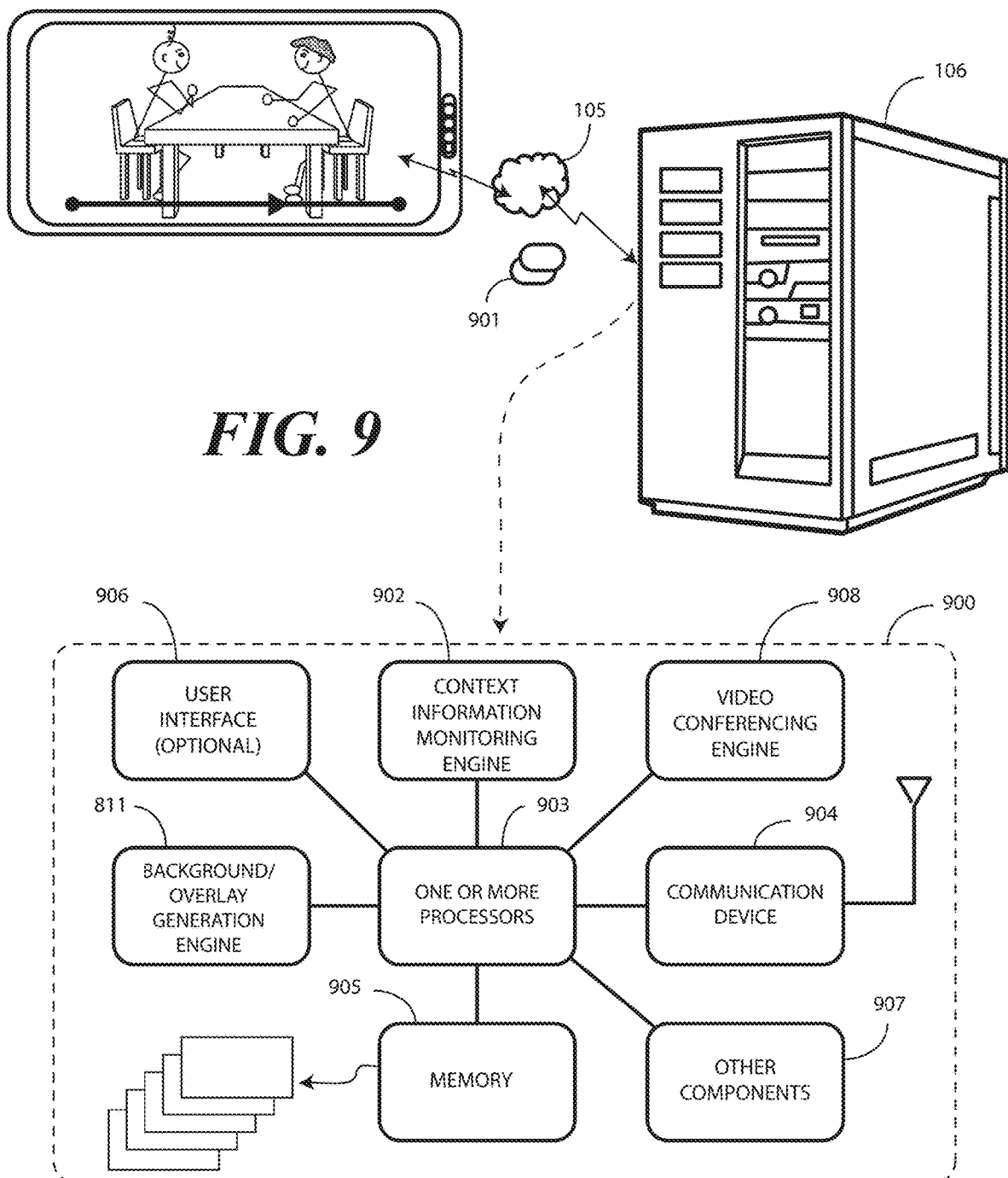
FIG. 9 illustrates one explanatory conferencing system server complex in accordance with one or more embodiments of the disclosure.

Advantageously, embodiments of the disclosure provide devices, systems, and methods that prevent such awkward situations. Additionally, embodiments of the disclosure provide unique and interesting ways to make the videoconference (100) more fun, engaging, interesting, and entertaining, even in situations other than that shown in FIG. 2. Embodiments of the disclosure accomplish this by providing a conferencing system terminal device 101 that includes one or more processors that, as shown in FIG. 4 below, automatically apply virtual background indicia in images 206 of a videoconference (100) behind a subject like participant 107. In the same way video background indicia can be applied, overlay indicia can dynamically and automatically be applied to images of a videoconference as well, as will be shown in FIGS. 6-7 below. Of course, a combination of the two techniques can be used as well, as shown in FIG. 9 below.

In one or more embodiments, the one or more processors of the conferencing system terminal device 101 automatically apply the video background indicia as a function of contextual information detected by one or more sensors of the conferencing system terminal device 101. In one or more embodiments, the application of the video background indicia occurs during the videoconference (100) and prior to a communication device of the conferencing system terminal device 101 transmitting the images 206 to at least one remote electronic device (here conferencing system terminal device 103) engaged in the videoconference (100).

Illustrating by example, in one or more embodiments the communication device of the conferencing system terminal device 101 receives one or more videoconference feeds 207 depicting one or more subjects, e.g., participant 107, engaged in the videoconference (100) from one or more remote electronic devices, one example of which is conferencing system terminal device 103. A contextual information extraction engine of the conferencing system terminal device 101 then extracts contextual information associated with the videoconference (100) from the one or more videoconference feeds 207. One or more processors of the conferencing system terminal device 101 then apply video background indicia and/or overlay indicia generated from the contextual information to at least one videoconference feed during the videoconference (100). Thereafter, a display of the conferencing system terminal device then presents the at least one videoconference feed after the video background indicia or the overlay indicia is applied.

Advantageously, by automatically applying one or both of the video background indicia and/or overlay indicia to a videoconference feed, embodiments of the disclosure automatically and dynamically create surprising, unique, appropriate, and contextually aware images for display during a videoconference (100). Accordingly, embodiments of the disclosure provide systems, methods, and devices that orchestrate the contextual information from various sources and offer a combination of automatically applied, dynamic backgrounds and overlays that create interesting and "cool" effects for everyone engaged in a videoconference (100).

Figure 3:
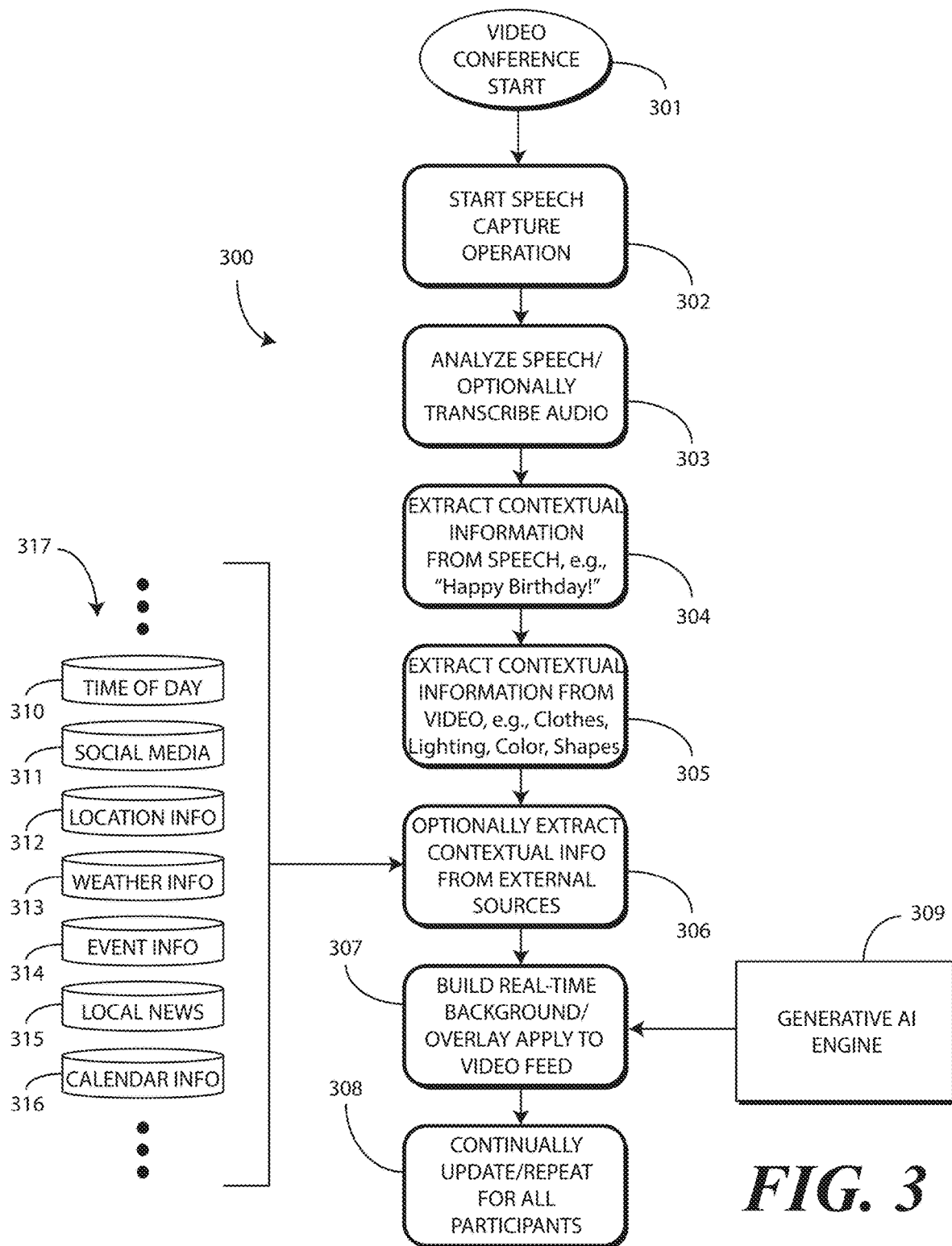
FIG. 3 illustrates one or more explanatory method steps suitable for implementation in one explanatory conferencing system configured in accordance with one or more embodiments of the disclosure to present background indicia to one explanatory videoconference feed.

Turning now to FIG. 3, illustrated therein is one explanatory method 300 for performing these operations. Beginning at stage 301, a videoconference is initiated. In one or more embodiments, the videoconference occurs across a network, one example of which is network (105) shown in FIG. 1. In one or more embodiments, the videoconference includes one or more videoconference feeds associated therewith. These videoconference feeds can include audio content and/or video content. The features described in conjunction with the method 300 of FIG. 3 using this video content and/or audio content could be performed in a conferencing system terminal device engaged in the videoconference initiated at stage 301 or, alternatively, by a videoconferencing server complex facilitating the videoconference initiated at stage 301.

In one or more embodiments, the initiation of the videoconference at stage 301 means that image capture devices of conferencing system terminal devices engaged in the videoconference begin capturing images of subjects participating in the videoconference. A communication device of the conferencing system terminal device then transmits the images to at least one remote electronic device engaged in the videoconference, optionally in conjunction with the operations of a conferencing system server complex facilitating the videoconference. Communication devices of those remote electronic devices receive one or more videoconference feeds, each of which can include an audio feed and a video feed, depicting the one or more subjects engaged in the videoconference from the other conferencing system terminal devices engaged in the videoconference.

As will be explained in more detail below with reference to FIG. 8, in one or more embodiments each conferencing system terminal device engaged in the videoconference includes an image capture device, a communication device, one or more sensors, and one or more processors. These conferencing system terminal devices can also include a contextual information extraction engine that is configured to extract contextual information from the audio content and/or video content associated with the audio and video feeds of the videoconference, respectively. The conferencing system terminal devices can also be equipped with a contextual information monitoring engine that monitors video or audio feeds for contextual information as well. Other components that can be included with the conferencing system terminal device will be described below with reference to FIG. 8. Still others will be obvious to those of ordinary skill in the art having the benefit of this disclosure.

At step 302, one or more processors of either a conferencing system terminal device or a conferencing system server complex begin a speech capture operation. As noted above, in one or more embodiments a videoconferencing system supports speech detection and audio transcription. In one or more embodiments, the one or more videoconference feeds associated with the videoconference that commences at stage 301 each have audio content associated therewith. One or more sensors of each conferencing system terminal device, one example of which is a microphone, or alternatively one or more sensors of a conferencing system server complex, capture the audio content from the one or more videoconference feeds associated with the videoconference at step 302.

At step 303, the captured audio content can be analyzed and/or transcribed. Illustrating by example, where a conferencing system terminal device is equipped with a contextual information extraction engine, the contextual information extraction engine can extract contextual information of the videoconference from the one or more videoconference feeds by extracting the contextual information from transcribed audio content at step 303. Moreover, one or more processors of the conferencing system terminal device can transcribe the audio content to create transcribed audio content at step 302. Step 303 can also include the one or more processors presenting the transcribed audio content on a display of the conferencing system terminal device as well.

Where the transcription is occurring in a conferencing system server complex instead of a conferencing system terminal device, step 303 can include a contextual information monitoring engine identifying contextual information from the transcribed audio content as well. As when the processing occurs in the conferencing system terminal device, processing in the conferencing system server complex can cause the transcribed audio content to be presented on the displays of the conferencing system terminal devices engaged in the videoconference at step 303 as well.

In one or more embodiments, one or more processors of the conferencing system terminal device or the videoconferencing server complex then perform operations to extract contextual information from the transcription of the speech present in the audio feed of the videoconference at step 304. Illustrating by example, step 304 may include the one or more processors detecting the words "how's the weather," or "congratulations," or "happy birthday" from the transcription created at step 303, and so forth. These examples of audio-based contextual information are illustrative only, as others will be obvious to those of ordinary skill in the art having the benefit of this disclosure.

Just as audio content can be monitored at step 302 and/or transcribed at step 303, with contextual information being identified therein or extracted therefrom at step 304, contextual information can be monitored, identified, or extracted from the video content associated with the videoconference commencing at stage 301 at step 305. Illustrating by example, one or more sensors of a conferencing system terminal device can detect contextual information from the video feeds associated with the videoconference at step 305.

Examples of such contextual information that the one or more sensors may be detect at step 305 include clothing worn by the subject, portions of the video feeds associated with the videoconference that are not occupied by the subject, portions of the video feeds associated with the videoconference depicting objects other than the subject, shapes detected in the portions of the images depicting objects other than the subject, and so forth. Other examples of contextual information can include logos or branding on clothing or other objects, watches or jewelry worn by the subject, hair color, clothing color, background colors, and so forth. Other examples of contextual information that may be extracted from the video feed include lighting conditions, a color palette associated with the portions of the images depicting objects other than the subject appearing in a particular video feed, and shapes of objects situated around the participant. These examples of video-based contextual information are illustrative only, as others will be obvious to those of ordinary skill in the art having the benefit of this disclosure.

In one or more embodiments, contextual information can also be extracted/received from external sources 317 as well. Illustrating by example, in one or more embodiments step 306 comprises either a conferencing system terminal device engaged in the videoconference or the conferencing system server complex receiving the contextual information from one or more remote electronic devices, examples of which include the external sources 317 shown in FIG. 3.

For instance, the contextual information extracted and/or received at step 306 from the external sources 317 can comprise time of day information received from a time-of-day server 310. In another embodiment, the contextual information extracted and/or received at step 306 from the external sources 317 can comprise social media information received from a social media server 311. In still another embodiment, the contextual information extracted and/or received at step 306 from the external sources 317 can comprise the contextual information comprising location information relating to a location of a conferencing system terminal device engaged in the videoconference that is received from a location server 312.

In yet another embodiment, the contextual information extracted and/or received at step 306 from the external sources 317 can comprise weather information in an environment of one or more conferencing system terminal devices engaged in the videoconference that is received from a weather server 313. In another embodiment, the contextual information extracted and/or received at step 306 from the external sources 317 can comprise event information, such as a notification of cancer awareness month, received from an event server 314. In still another embodiment, the contextual information extracted and/or received at step 306 from the external sources 317 can comprise local news received from a local news server 315.

In yet other embodiments, the contextual information extracted and/or received at step 306 from the external sources 317 can comprise scheduling or calendaring information received from a calendaring server 316. These examples of contextual information that can be extracted and/or received from external sources 317 at step 306 are illustrative only. Numerous other examples of such contextual information will be obvious to those of ordinary skill in the art having the benefit of this disclosure. Moreover, they can be received and/or extracted at step 306 alone or in combination as well.

At step 307, the method 300 includes generating one or both of video background indicia and/or overlay indicia as a function of the contextual information extracted and/or received at any of steps 304-306. Again, the operations of step 307 could be performed in a conferencing system terminal device engaged in the videoconference initiated at stage 301 or, alternatively, by a videoconferencing server complex facilitating the videoconference initiated at stage 301.

In one or more embodiments, step 307 comprises one or more processors of a conferencing system terminal device generating and automatically applying virtual background indicia in the images associated with one or more video feeds of the videoconference as a function of contextual information detected by one or more of the one or more sensors, the contextual information extraction engine, and/or the contextual information monitoring engine during the videoconference. For example, the one or more processors may automatically apply the video background indicia behind the subject appearing the images associated with one or more video feeds of the videoconference at step 307. In one or more embodiments, this generation and automatic application occurring at step 307 occurs prior to the communication device of the conferencing system terminal device transmitting the images to other conferencing system terminal devices engaged in the videoconference. In one or more embodiments, step 307 comprises generating the video background indicia in real time as a function of the contextual information detected and/or extracted by the one or more sensors, the contextual information extraction engine, and/or the contextual information monitoring engine at steps 303-306.

Similarly, step 307 can comprise the one or more processors of the conferencing system terminal device automatically applying overlay indicia generated from the contextual information to at least one videoconference feed. In one or more embodiments, step 307 comprises this generation and application of the overlay indicia occurring in real time during the videoconference. Step 307 can further include a display of the conferencing system terminal device presenting the at least one videoconference feed after the overlay indicia is applied as well.

Step 307 can comprise other functions and presentations as well. For instance, where step 303 comprises the one or more processors of either a conferencing system terminal device or a conferencing system server complex transcribing the audio content from one or more audio feeds associated with the videoconference initiated at stage 301 to create transcribed audio content, step 307 can include causing the display of one or more of the conferencing system terminal devices presenting portions of the transcribed audio content comprising the contextual information used to generate the overlay indicia.

If the transcribed audio includes the words "happy birthday," for example, the overlay information may include an image of a birthday cake to provide birthday wishes with the transcribed words "happy birthday" appearing, and optionally being distinguished from other transcribed words, on the display to indicate that the image of the cake is a function of the "happy birthday" contextual information. Alternatively, when the overlay indicia comprising one or more of an image of balloons, the word "congratulations," or the word "congrats" may appear as the contextual information, and so forth.

Accordingly, in one or more embodiments step 307 comprises one or more processors of a conferencing system terminal device or a conferencing system server complex causing the display of one or more conferencing system terminal devices engaged in the videoconference initiated at stage 301 to present the portions of the transcribed audio content comprising the contextual information concurrently with presentation of the overlay indicia. Step 307 can comprise the one or more processors further causing the display to present a visual identifier, e.g., a box, circle, highlight, boldfaced font, italicized font, different font, different color, or other distinguishing characteristic that distinguishes the contextual information from other portions of the transcribed audio content. If the words "Hello there—oh wait—it's your birthday, Emma—happy birthday!" are presented as transcribed audio along with an image of a birthday cake, the words "happy birthday" may be distinguished from the words "Hello there—oh wait—it's your birthday, Emma—happy birthday" via the usage of a visual identifier such as a box, circle, highlight, boldfaced font, italicized font, different font, different color, or other distinguishing characteristic.

The one or more processors of the conferencing system terminal device and/or conferencing system server complex may optionally employ a generative artificial intelligence engine 309 to create the video background indicia and/or overlay indicia at step 307. In one or more embodiments, one or both of the conferencing system terminal devices engaged in the videoconference initiated at stage 301 and/or the conferencing system server complex facilitating the videoconference initiated at stage 301 are equipped with a generative artificial intelligence engine 309 that includes an artificial neural network or other similar technology that detects the contextual information and generates, as a function of this contextual information, video background indicia and/or overlay indicia for application to one or more video feeds associated with the videoconference initiated at stage 301. The generative artificial intelligence engine 309 can receive the contextual information from various sensors, the external sources 317, or from other sensors or sources.

At step 308, the method 300 can repeat. Illustrating by example, step 308 can comprise the one or more processors of one or both of the conferencing system terminal devices engaged in the videoconference initiated at stage 301 and/or the conferencing system server complex facilitating the videoconference initiated at stage 301 changing the virtual background indicia and/or the overlay indicia when the contextual information changes. Step 308 can comprise the virtual background indicia being generated, and then re-generated, in real time as a function of the contextual information received from the one or more external sources 317. Thus, the presentation of one the video background indicia and/or the overlay indicia can dynamically change as the videoconference initiated at stage 301 proceeds to continually, and automatically, create interesting and "cool" effects for everyone engaged in a videoconference intimated at stage 301.

Thus, in one or more embodiments the method 300 of FIG. 3 system supports speech detection (step 302) and audio transcription (step 303). These features can be performed in a conferencing system terminal device engaged in the videoconference initiated at stage 301 or, alternatively, by a videoconferencing server complex facilitating the videoconference initiated at stage 301. In one or more embodiments, one or more processors of the conferencing system terminal device or the videoconferencing server complex perform operations to extract, at step 304, contextual information from the transcription of the speech present in the audio feed of the videoconference. Illustrating by example, the one or more processors may detect the words "how's the weather," or "congratulations," or "happy birthday" from the transcription.

Contextual information can also be extracted from the video feed associated with the videoconference as well in one or more embodiments at step 305. Examples of such contextual information include the clothes being worn by a videoconference participant, logos or branding on such clothes, watches or jewelry worn by the participant, and so forth. Other examples of contextual information that may be extracted from the video feed include lighting conditions, a color palette associated with a particular video feed, shapes around the participant, and so forth.

In one or more embodiments, contextual information can also be extracted from external sources such as cloud servers, networked servers, other electronic devices, social media servers, and so forth at step 306. Examples of this contextual information include the time of day, the location of one or more participants engaged in the videoconference, weather information at locations of the one or more participants engaged in the videoconference, and so forth. Other examples of contextual information available from other sources includes the fact that important events such as cancer awareness month, pride parades, national holidays, and rivalry football games.

In one or more embodiments, once this contextual information is extracted and/or obtained, one or more processors of one or both of a conferencing system terminal device or a videoconference server complex use generative techniques, optionally with the assistance of a generative artificial intelligence engine 309, to construct and apply one or both of real time video background indicia or real time overlay indicia to apply to the video feed of one or more participants of the videoconference at step 307. Illustrating by example, one or more processors of a conferencing system terminal device may, at step 307, apply a virtual background generated as a function of the contextual information to portions of the images depicting objects other than the subject to create contextually background modified images of the subject. A communication device of the conferencing system terminal device may then transmit the contextually background modified images of the subject a network to another conferencing system terminal device engaged in the videoconference. Similarly, one or more processors of a conferencing system terminal device and/or of a videoconference server complex may apply an overlay generated as a function of the contextual information to portions of the images depicting objects other than the subject to create contextually modified images of the subject at step 307. The one or more processors can then present the contextually modified images of the subject on a display.

Accordingly, the method 300 of FIG. 3 orchestrates the contextual information from various sources at steps 304-306 and offers a combination of automatically applied, dynamic backgrounds and overlays at step 307 that create interesting and wonderful effects for everyone engaged in the videoconference initiated at stage 301. Turning now to FIGS. 4-7, illustrated therein are several examples of illustrating the method (300) of FIG. 3 operating in a videoconference.

Beginning with FIG. 4, the scene is similar to that illustrated in FIG. 2. However, in this situation participant 107 has an automatic and dynamic background and overlay system actuated in his conferencing system terminal device 101 while engaged in the videoconference (100) of FIG. 1. Illustrated therein is the portion 200 of the videoconference (100) of FIG. 1 again depicting the expanded view of participant 107 as he engages in the videoconference (100).

Once again, participant 107 is on the go during work hours and, rather than being home in an office working, is instead standing in front of the legendary restaurant Buster's Chicken Stand 201. The field of view 202 of the participant's conferencing system terminal device 101 is wide enough that the raw video feed that would be transmitted from the conferencing system terminal device 101 would include not only an image 204 of the participant, who is the subject of the video feed, but also a background image (205) of Buster's Chicken Stand 201, as was the case in FIG. 2.

In this illustrative embodiment, however, one or more processors of the conferencing system terminal device 101 execute a method in accordance with embodiments of the disclosure that provide for the automatic and dynamic presentation of both video background indicia and overlay indicia in a modified video feed 403. Specifically, the one or more processors of the conferencing system terminal device 101, optionally using one or more sensors of the conferencing system terminal device 101, identify contextual information 404, 405, 406 occurring during the videoconference (100). In one or more embodiments, this identification of the contextual information 404, 405, 406 occurs while the subject is engaged in the videoconference (100). Said differently, in one or more embodiments the contextual information 404, 405, 406 is identified contemporaneously with the occurrence of the videoconference (100), which makes the contextual information 404, 405, 406 real-time contextual information. Additionally, in some embodiments the contextual information 404, 405, 406 is identified from within an environment 410 of the conferencing system terminal device 101. In other embodiments, the contextual information 404, 405, 406 is pulled from external sources (317) as explained above with reference to FIG. 3. Of course, combinations of these two approaches could be used as well.

In this illustrative embodiment, as the image capture device of the conferencing system terminal device 101 captures images 407 of the subject engaged in the videoconference (100) (here, participant 107) to be included in the video feed used in the videoconference (100), the one or more processors of the conferencing system terminal device 101 do two things: First, they apply a virtual background 401 to portions of the images 407 to be included with the modified video feed 403 depicting objects other than the subject as a function of the contextual information 404, 405, 406 to create contextually background modified images 408 of the subject. Second, the one or more processors apply an overlay 402 that generated as a function of the contextual information 404, 405, 406 to portions of the images depicting objects other than the subject to create contextually modified images 409 of the subject.

In this illustrative embodiment, the contextually background modified images 408 of the subject and the other contextually modified images 409 of the subject are superimposed in the modified video feed 403. In other embodiments, the contextually background modified images 408 of the subject and the contextually modified images 409 of the subject will be the same images after undergoing two different operations: one to apply the video background indicia and another to apply the overlay indicia. Also, while both video background indicia and overlay indicia are applied in FIG. 4, as noted above these procedures can be performed independently instead, with the contextually modified images of the subject in the modified video feed 403 having one or the other of the video background indicia or the overlay indicia.

The contextual information 404, 405, 406 can take a variety of forms. Illustrating by example, in one or more embodiments the contextual information 404, 405, 406 comprises clothes worn by the subject. In other embodiments, the contextual information 404, 405, 406 comprises a color palette associated with the portions of the images depicting objects other than the subject.

In still other embodiments, the contextual information 404, 405, 406 comprises shapes detected in the portions of the images depicting objects other than the subject. In still other embodiments, the contextual information 404, 405, 406 comprises time of day information. In still other embodiments, the contextual information 404, 405, 406 comprises location information relating to a location of the conferencing system terminal device 101. The contextual information 404, 405, 406 can also comprise weather information in an environment 410 of the conferencing system terminal device 101.

In addition to detecting, identifying, and/or receiving the contextual information 404, 405, 406 from the environment 410 of the conferencing system terminal device 101, the one or more processors of the conferencing system terminal device 101 can also retrieve the contextual information 404, 405, 406 from external sources (317) as previously described. Moreover, in one or more embodiments the one or more processors retrieve the virtual background 401 itself from a remote server or other external sources (317).

For instance, rather than generating the virtual background 401 or other video background indicia in the conferencing system terminal device 101 itself, a server, cloud server, or other external source (317) can generate the video background indicia or overlay indicia and deliver it either to the conferencing system terminal device 101 capturing the images 407 of the subject for application to those images prior to transmission to other conferencing system terminal devices, e.g., conferencing system terminal device 103, or to the conferencing system terminal device 103 receiving the video feed for application prior to the presentation on a display. Accordingly, a communication device of the conferencing system terminal device 101 can receive either or both of the contextual information 404, 405, 406 and/or the virtual background 401, the overlay, other video background indicia, and/or other overlay indicia from one or more external sources (317) across a network 105. Other techniques for when, how, and where to apply the video background indicia and overlay indicia to the images 407 of the subject will be obvious to those of ordinary skill in the art having the benefit of this disclosure.

In the illustrative embodiment of FIG. 4, the contextual information 404, 405, 406 used for the generation of the virtual background 401 is seasonal information obtained from a weather server 412 across a network 105. Since the videoconference (100) is occurring in the fall, the virtual background 401 is being generated as a function of this seasonal information and includes a harvest motif with a fall color palette that presents autumnal hues. Since the virtual background 401 is being applied to portions of the images 407 to be included with the modified video feed 403 depicting objects other than the subject as a function of the contextual information 404, 405, 406 to create contextually background modified images 408 of the subject, in the illustrative embodiment of FIG. 4 the virtual background 401 obscures portions of the images 407 depicting objects other than the subject. Accordingly, the background image (205) of Buster's Chicken Stand 201 is replaced with a contextually based virtual background 401 that includes a harvest motif since the context upon which the virtual background 401 was created is the time of year, with the videoconference (100) occurring in the fall.

In this illustrative embodiment, the overlay 402 is similarly created and applied. In one or more embodiments, the contextual information 404, 405, 406 comprises event information. Cancer Awareness Month also occurs in the fall. Since the videoconference (100) is being held during October, this example the event information comprises the occurrence of Cancer Awareness Month. The one or more processors of the conferencing system terminal device 101 automatically applying overlay indicia in the form of the overlay 402 generated from the contextual information 404, 405, 406 to at least one videoconference feed during the videoconference (100). Here, the overlay 402 states, "It's CANCER AWARENESS MONTH! Make sure to get those colonoscopies and mammograms!" The addition of the overlay 402 makes not only for a more whimsical and more interesting videoconference, but for an educational one as well. Other types of overlays suitable for use during videoconferences will be obvious to those of ordinary skill in the art having the benefit of this disclosure.

In the illustrative embodiment of FIG. 4, the one or more processors of the conferencing system terminal device 101 capturing the images 407 of the subject applies the virtual background 401 and the overlay 402. However, in other embodiments this application can be performed on the receiving end. Illustrating by example, if a communication device of conferencing system terminal device 101 is receiving images 411, one or both of the virtual background 401 and/or overlay 402 can be applied after receipt of these images 411 and before they are presented locally on the display of conferencing system terminal device 101.

In one or more embodiments, presentation of the video background indicia is continuous during the duration of the videoconference (100). Embodiments of the disclosure contemplate that the participant 107 may want Buster's Chicken Shack 201 to be continually obscured during the videoconference (100) so that it looks as if he is diligently working rather than eating the delicious delicacies Buster prepares. However, in one or more embodiments the duration of the presentation of the video background indicia can be dictated by the participant 107 using one or more user settings of the conferencing system terminal device 101.

To keep things moving, happening, and hip, in one or more embodiments the one or more processors of the conferencing system terminal device 101 change the presentation of video background indicia when the contextual information changes. In the example of FIG. 4, unless this is just a really, really, really long videoconference, it will still be fall when the videoconference (100) ends. Accordingly, if the video background indicia continue to be generated as a function of seasonal contextual information, the virtual background 401 presented in FIG. 4 may continue for the duration of the videoconference (100). However, if the contextual information 404, 405, 406 had been weather information, for example, and it stopped raining during the videoconference (100), the virtual background 401 may change when the contextual information 404, 405, 406, changes. Moreover, video background indicia may be generated from a variety of contextual information 404, 405, 406 as well in predefined duration intervals. During the first portion of the videoconference (100), the contextual information 404, 405, 406 may be seasonal contextual information, while the contextual information 404, 405, 406 used to generate the video background indicia changes to social media contextual information during the next portion of the videoconference (100), and so forth. In still other embodiments, such as where the video background indicia are generated from transcribed conversation occurring during the videoconference (100) (see FIG. 6 below), the video background indicia will change as the conversation changes.

By contrast, embodiments of the disclosure contemplate that the presentation of overlay indicia will be temporary in nature. As will be described below with reference to FIG. 5, in one or more embodiments the contextual information 404, 405, 406 upon which the overlay indicia are based is transcribed text captured during the videoconference (100). Accordingly, if someone says, "that herbal tea you're drinking looks really tasty," overlay indicia depicting steam or a pot of tea or hibiscus herbs may be presented only temporarily in the video feeds of the videoconference (100). Accordingly, in one or more embodiments, the one or more processors of a conferencing system terminal device apply the overlay 402 only temporarily in response to the one or more processors identifying the contextual information 404, 405, 406 associated with the subject engaged in the videoconference (100). As with the video background indicia, further comprising he overlay 402 can be updated as the contextual information 404, 405, 406 changes.

When one or both of the video background indicia or overlay indicia is applied to images 407 of the subject captured by an image capture device of a local conferencing system terminal device 101, once they are applied the communication device of the conferencing system terminal device 101 transmits the contextually background modified images 408 and/or the other modified images 409 across the network 105 to the other conferencing system terminal devices participating in the videoconference (100). Those conferencing system terminal devices then present the contextually background modified images 408 and/or the other modified images 409 on a local display.

Figure 5:
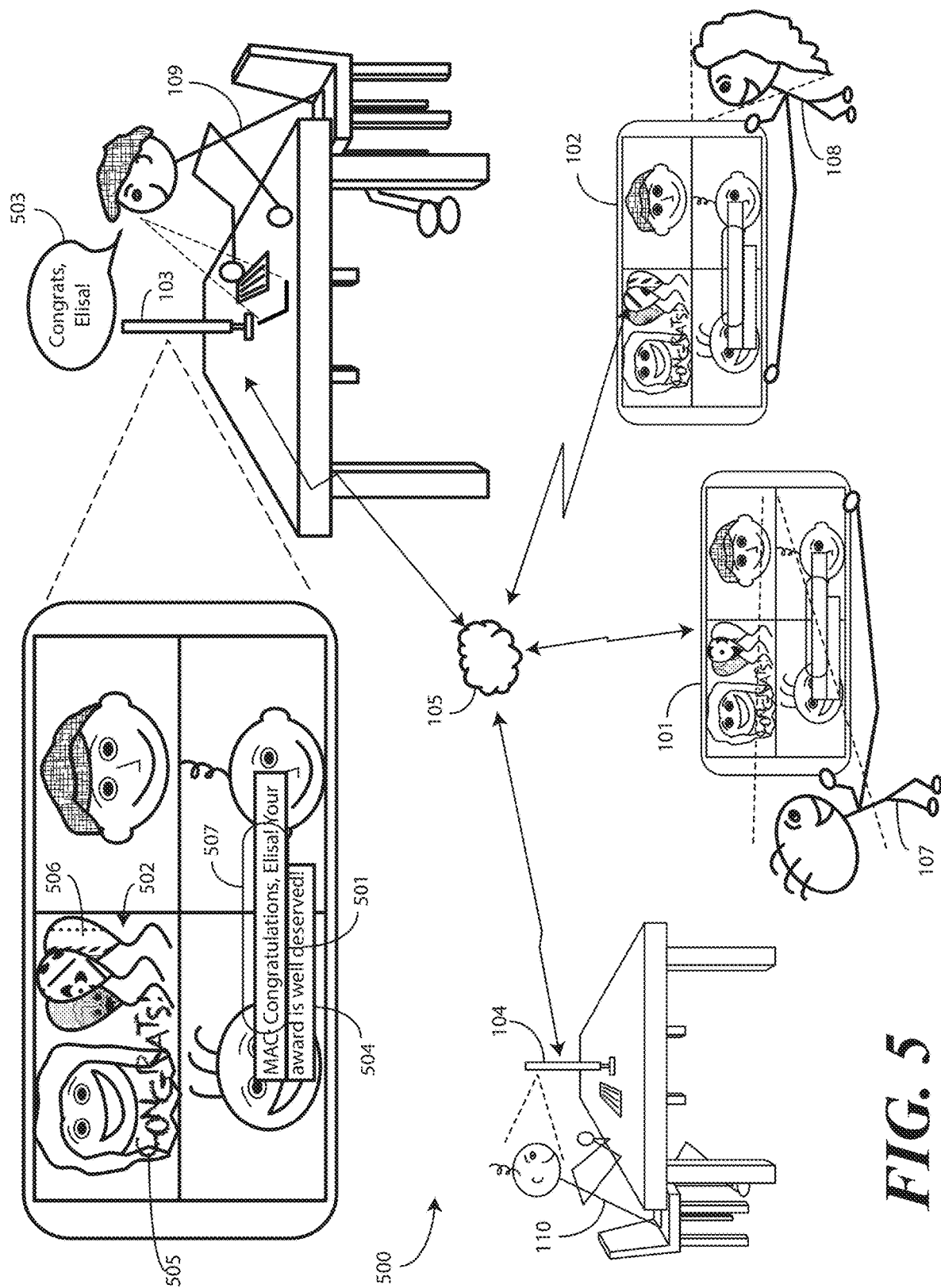
FIG. 5 illustrates one explanatory conferencing system, along with one or more method steps, in accordance with one or more embodiments of the disclosure.

Turning now to FIG. 5, illustrated therein is an example of a videoconference 500 occurring where overlay indicia 502 is generated as a function contextual information that is detected in the form of speech captured and transcribed during the videoconference 500.

In this illustrative embodiment, multiple participants 107, 108, 109, 110 again each employ their own respective conferencing system terminal device 101, 102, 103, 104 to engage with the other participants via the videoconference 500. Each conferencing system terminal device 101, 102, 103, 104 is engaged in wired or wireless communication with each other across a network 105 as the participants 107, 108, 109, 110 are engaged in the videoconference 500.

Each conferencing system terminal device 101, 102, 103, 104 could be in communication with a video conferencing system server complex (106) across the network 105 as was the case in FIG. 1. The video conferencing system server complex (106), where included and participating, facilitates the videoconference 500 between the various conferencing system terminal devices 101, 102, 103, 104. In this illustrative embodiment, the various conferencing system terminal devices 101, 102, 103, 104 include on-board software allowing the videoconference 500 to occur without the videoconferencing conferencing system server complex (106).

Since the participants 107, 108, 109, 110 are all engaged in a videoconference, each can see conference content in the form of a combined video feed from each other participant 107, 108, 109, 110 presented on the display of each conferencing system terminal device 101, 102, 103, 104, as well as a video feed of themselves. Under ordinary conditions, each participant 107, 108, 109, 110 can hear an audio feed from each other participant 107, 108, 109, 110 as well.

In this illustrative embodiment, participant 109 is speaking, noting that congratulations are in order for another participant 108, Elisa. During his comments, participant 109 states, "Congratulations, Elisa, your award is well deserved," which constitutes audio content 503 associated with the videoconference 500. One or more processors of the conferencing system terminal device 103 (or alternatively a conferencing system server complex (106) where included)

transcribe this audio content to create transcribed audio content 501, portions of which are presented atop images of the videoconference 500 as overlay indicia 504. Said differently, in one or more embodiments one or more processors of the conferencing system terminal device 103 (or alternatively a conferencing system server complex (106) where included) transcribe the audio content 503 received from other subjects engaged in the videoconference 500 containing the contextual information associated with another subject, here, Elisa, engaged int eh videoconference as transcribed audio content 501 and present portions of the transcribed audio content 501 comprising the contextual information on the displays of each conferencing system terminal device 101, 102, 103, 104.

In one or more embodiments, the one or more processors of the conferencing system terminal device 103 (or alternatively a conferencing system server complex (106) where included) generate overlay indicia 502 as a function of contextual information, which in this embodiment constitutes the portions of the transcribed audio content 501 presented as overlay indicia 504. In this illustrative example, the overlay indicia 502 generated as a function of the portions of the transcribed audio content 501 presented as other overlay indicia 504 comprise congratulatory wishes 505 and depictions 506 of one or more balloons that are presented atop the image of Elisa. The congratulatory wishes 505 comprise the word "congrats" followed by several exclamation points, while the depictions 506 of the one or more balloons emphasize the celebratory nature of the portions of the transcribed audio content 501 upon which the overlay indicia 502 was generated.

In this illustrative embodiment, the overlay indicia 502 including the congratulatory wishes 505 and the depictions 506 of the one or more balloons are presented at atop the image of Elisa in each video feed. Said differently, the one or more processors of the conferencing system terminal device 103 (or alternatively a conferencing system server complex (106) where included) in this illustrative embodiment apply the overlay indicia 502 to portions of the video feed by superimposing at least some of the overlay indicia 502 atop the subject, here, Elisa, in the images of the video feed.

In one or more embodiments, the one or more processors of the conferencing system terminal device 103 (or alternatively a conferencing system server complex (106) where included) cause the displays of each conferencing system terminal device 101, 102, 103, 104 to present the overlay indicia 504 containing the portions of the transcribed audio content 501 comprising the contextual information upon which the overlay indicia 502 was generated concurrently with the overlay indicia 502 itself. Such is the case in FIG. 5, where the transcribed audio content "congratulations, Elisa, your award is well deserved" is presented concurrently with the congratulatory wishes 505 and the depictions 506 of the one or more balloons.

So that no participant is left in the dark as to what is going on, in one or more embodiments the one or more processors of the conferencing system terminal device 103 (or alternatively a conferencing system server complex (106) where included) further cause each display of each conferencing system terminal device 101, 102, 103, 104 to present a visual identifier 507 distinguishing the contextual information used to generate the overlay indicia 502 from other portions of the transcribed audio content 501. Here, the visual identifier 507 is illustrated as a graphical indicator identifying the contextual information in the portions of the transcribed audio content 501 taking the form of a circle around the words "congratulations, Elisa," thereby alerting the other participants 107, 110 why the congratulatory wishes 505 and the depictions 506 of the one or more balloons are being presented on their respective displays.

Figure 6:
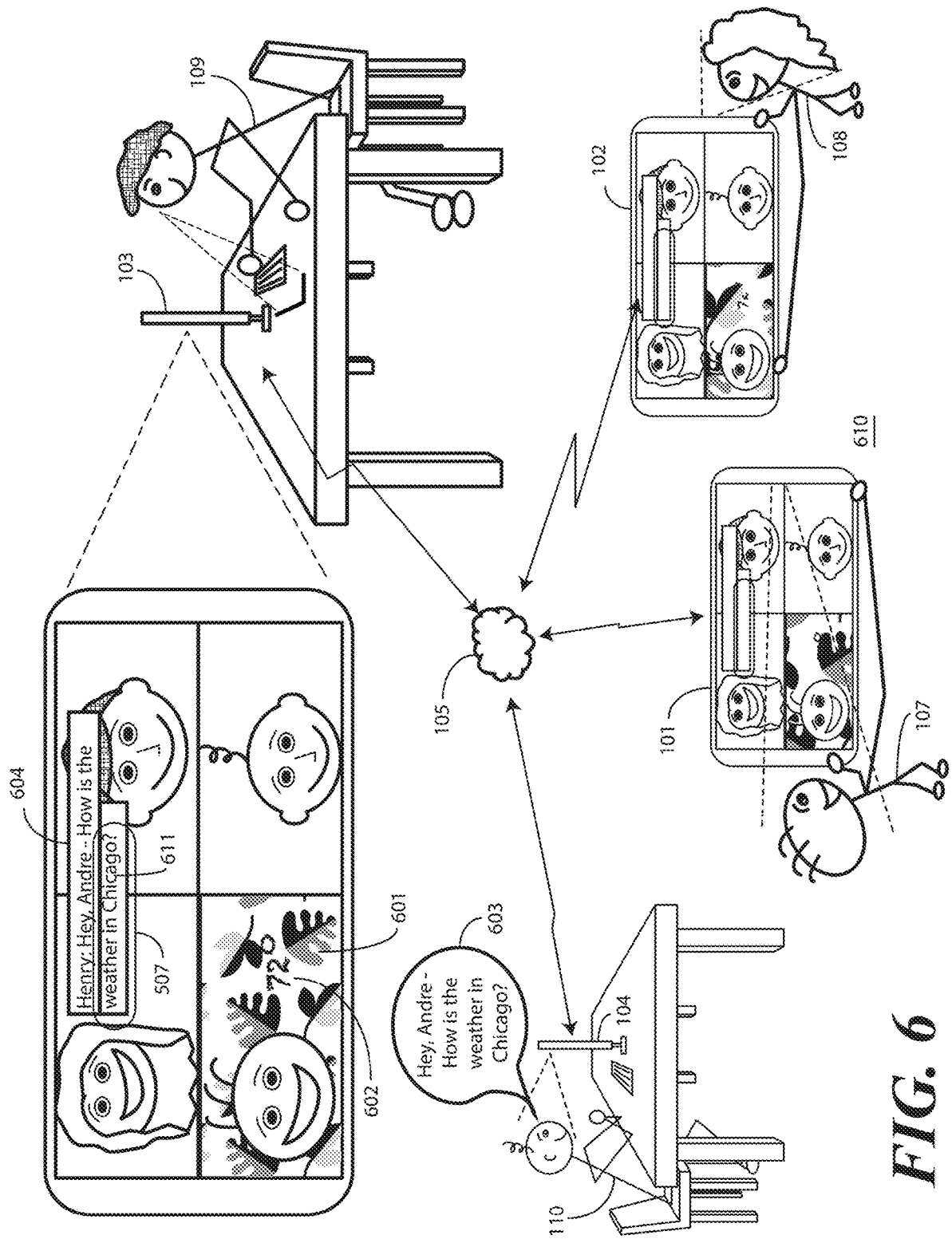
FIG. 6 illustrates one explanatory conferencing system, along with one or more method steps, in accordance with one or more embodiments of the disclosure.

Turning now to FIG. 6, illustrated therein is the videoconference 500, still ongoing, but at a later time than that shown in FIG. 5. At this time in the videoconference 500, participant 110 is speaking, with his audio content 603 occurring in the form of a question. To wit, participant 110 is asking participant 107, Andre, how the weather is at a location at which the conferencing system terminal device 101 belonging to participant 107 is situated. Participant 110 asks Andre, "Hey, Andre, how is the weather in Chicago?"

As before, one or more processors of the conferencing system terminal device 103 (or alternatively a conferencing system server complex (106) where included) transcribe this audio content 603 to create transcribed audio content 611, portions of which are presented atop images of the videoconference 500 as overlay indicia 604. Thus, in this illustrative embodiment conferencing system terminal device 103 (or alternatively a conferencing system server complex (106) where included) are configured to extract one or more questions from the transcribed audio content 611 for presentation on the displays of the conferencing system terminal devices 101, 102, 103, 104 engaged in the videoconference 500.

In one or more embodiments, rather than—or in addition to—Andre answering, the one or more processors of the conferencing system terminal device 103 (or alternatively a conferencing system server complex (106) where included) are configured to present one or more answers to the one or more questions as overlay indicia in the video feeds of the videoconference 500. This can be done in various ways.

In one or more embodiments, the one or more processors of a local conferencing system terminal device can use one or more sensors to extract information from an environment about the conferencing system terminal device, where appropriate. For instance, one or more processors of conferencing system terminal device 101 could employ one or more sensors to determine a temperature in the environment 610 of conferencing system terminal device 101 in response to the question "how's the weather." Similarly, the one or more sensors could include a moisture sensor to determine whether there was rain within the environment 610 of the conferencing system terminal device 101. The one or more sensors could similarly include a light sensor to determine whether the environment 610 of the conferencing system terminal device 101 was sunny or cloudy, and so forth.

In the illustrative embodiment of FIG. 6, the one or more processors of conferencing system terminal device 103 (or alternatively a conferencing system server complex (106) where included) cause a communication device to query a remote server across the network 105 to obtain the one or more answers to the one or more questions. An example of an appropriate remote server in this example would be the weather server (313) of FIG. 3.

In one or more embodiments, the one or more processors of the conferencing system terminal device 103 (or alternatively a conferencing system server complex (106) where included) generate overlay indicia 602 as a function of contextual information, which in this embodiment constitutes the portions of the transcribed audio content 611 presented as overlay indicia 604. In this illustrative example, the overlay indicia 602 generated as a function of the portions of the transcribed audio content 611 presented as other overlay indicia 604 comprise an indication that the temperature in Chicago is 72 degrees. In this illustrative embodiment, the one or more processors of the conferencing system terminal device 103 (or alternatively a conferencing system server complex (106) where included) also present video background indicia 601 showing falling leaves due to the fact that the contextual information upon which the video background indicia 601 was based is seasonal contextual information. In this illustrative embodiment, rather than being presented atop the subject, the overlay indicia 602 is presented to the side of the subject, i.e., in portions of images of the subject other than those occupied by the subject.

In this illustrative embodiment, the overlay indicia 602, video background indicia 601, and the portions of the transcribed audio content 611 comprising the contextual information upon which the overlay indicia 602 was generated are presented concurrently. As such, "hey, Andre, how is the weather in Chicago" is presented concurrently with the answer, which is embodied by the overlay indicia 602. Accordingly, in this illustrative embodiment the one or more processors of the conferencing system terminal device 103 (or alternatively a conferencing system server complex (106) where included) present both the one or more questions extracted from the transcribed content and the answers to those one or more questions on the displays of the conferencing system terminal devices 101, 102, 103, 104 simultaneously. Here, the contextual information upon which the overlay indicia 602 was based comprises weather information corresponding to an environment 610 where conferencing system terminal device 101 is situated and, in particular, comprises a depiction of a temperature of the environment 610. Instead of the depiction of the temperature, the overlay indicia 602 could likewise comprise a depiction of precipitation (or lack thereof as shown in the video background indicia 601) occurring in the environment 610. Other examples of weather-based overlay indicia 602 will be obvious to those of ordinary skill in the art having the benefit of this disclosure.

In one or more embodiments the one or more processors of the conferencing system terminal device 103 (or alternatively a conferencing system server complex (106) where included) further cause each display of each conferencing system terminal device 101, 102, 103, 104 to present a visual identifier 507 distinguishing the contextual information used to generate the overlay indicia 602 from other portions of the transcribed audio content 611. Here, the visual identifier 507 is illustrated as a graphical indicator identifying the contextual information in the portions of the transcribed audio content 611 taking the form of an oblong, rounded-corner rectangle around the words "weather in Chicago," thereby alerting the other participants 107, 109, 110 why a depiction of the temperature is present on their respective displays.

As noted above, in one or more embodiments the presentation of overlay indicia 602 and/or video background indicia 601 can be generated in real time and can change when the contextual information associated with the videoconference 500 changes. To illustrate this, turn now to FIG. 7 where the videoconference 500 is still ongoing. Participant 110 notes that the videoconference 500 has extended for a very long duration, noting "Man, this meeting is taking forever." In fact, the meeting has continued for such a long time that Elisa had to jump off the call due to a prior engagement.

Figure 7:
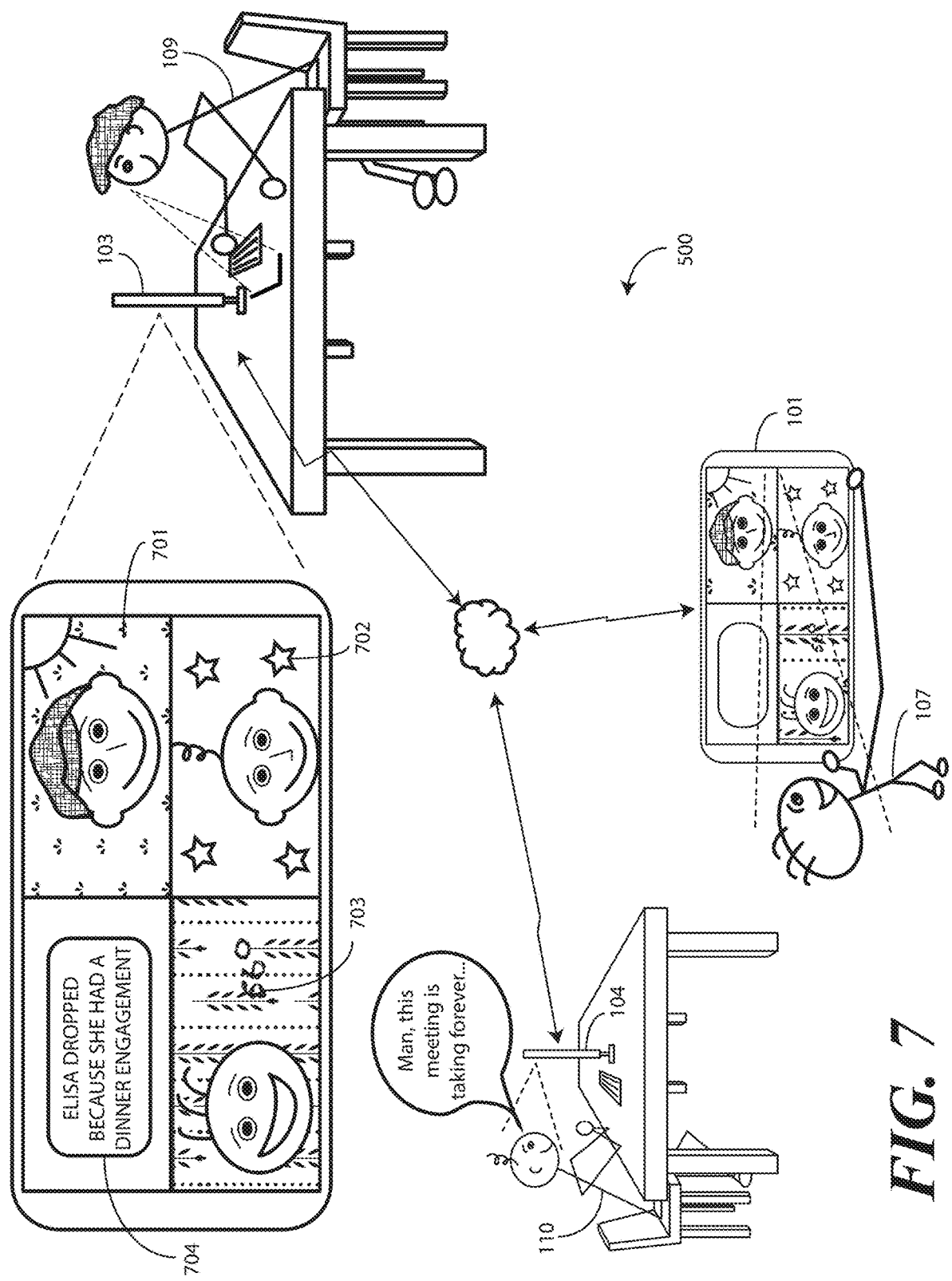
FIG. 7 illustrates one explanatory conferencing system, along with one or more method steps, in accordance with one or more embodiments of the disclosure.

In the time that passed from the scene in FIG. 6 to the scene in FIG. 7, much contextual information has changed. For participant 109, night has become day. For participant 107, it has started raining. For participant 110, day has become night. Advantageously, conferencing system terminal device 103 (or alternatively a conferencing system server complex (106) where included) detect, optionally using one or more sensors and/or by communicating with one or more remote electronic devices, new contextual information and use the new contextual information to automatically and dynamically create and apply one or both of new video background indicia and/or new overlay indicia to images in video feeds of the videoconference 500.

In this illustrative example, video background indicia 701 has been placed in portions of the images depicting objects other than participant 109 indicating sun and light clouds due to the fact that the video background indicia 701 was generated as a function of time of day-based contextual information. Similarly, video background indicia 702 has been placed in portions of the images depicting objects other than participant 110 indicating that the stars are out due to the fact that the video background indicia 702 was also generated as a function of time of day-based contextual information. Video background indicia 703 has been placed in portions of the images depicting objects other than participant 107 indicating rain is falling due to the fact that the video background indicia 703 was generated as a function of weather-based contextual information.

In a similar manner, overlay indicia 704 has been placed atop the video feed formerly depicting Elisa. In this illustrative example, the contextual information upon which the overlay indicia 704 is based is scheduling or calendar-based contextual information. Accordingly, the overlay indicia 704 is in the form of an informational banner indicating Elisa left because she had a scheduling conflict, namely, big dinner plans at Buster's Chicken Shack (201). The video background indicia and overlay indicia shown in FIG. 7 is illustrative only, as other examples will readily be obvious to those of ordinary skill in the art having the benefit of this disclosure.

As shown and described with reference to the examples illustrated in FIGS. 4-7, embodiments of the disclosure provide devices, systems, and methods that provide unique and interesting ways to make the videoconference more fun, engaging, interesting, and entertaining. Embodiments of the disclosure accomplish this by providing a conferencing system terminal device that includes one or more processors, or alternatively a conferencing system server complex (where included) that automatically applies one or both of virtual background indicia in images of a videoconference behind a subject. In one or more embodiments, the one or more processors automatically apply the video background indicia and/or overlay indicia as a function of contextual information either detected by one or more sensors or received from a remote electronic device such as a server in communication with a conferencing system terminal device across a network.

Advantageously, by automatically applying one or both of the video background indicia and/or overlay indicia to a videoconference feed, embodiments of the disclosure automatically and dynamically create surprising, unique, appropriate, and contextually aware images for display during a videoconference. Accordingly, embodiments of the disclosure provide systems, methods, and devices that orchestrate the contextual information from various sources and offer a combination of automatically applied, dynamic backgrounds and overlays that create interesting and "cool" effects for everyone engaged in a videoconference.

Figure 8:
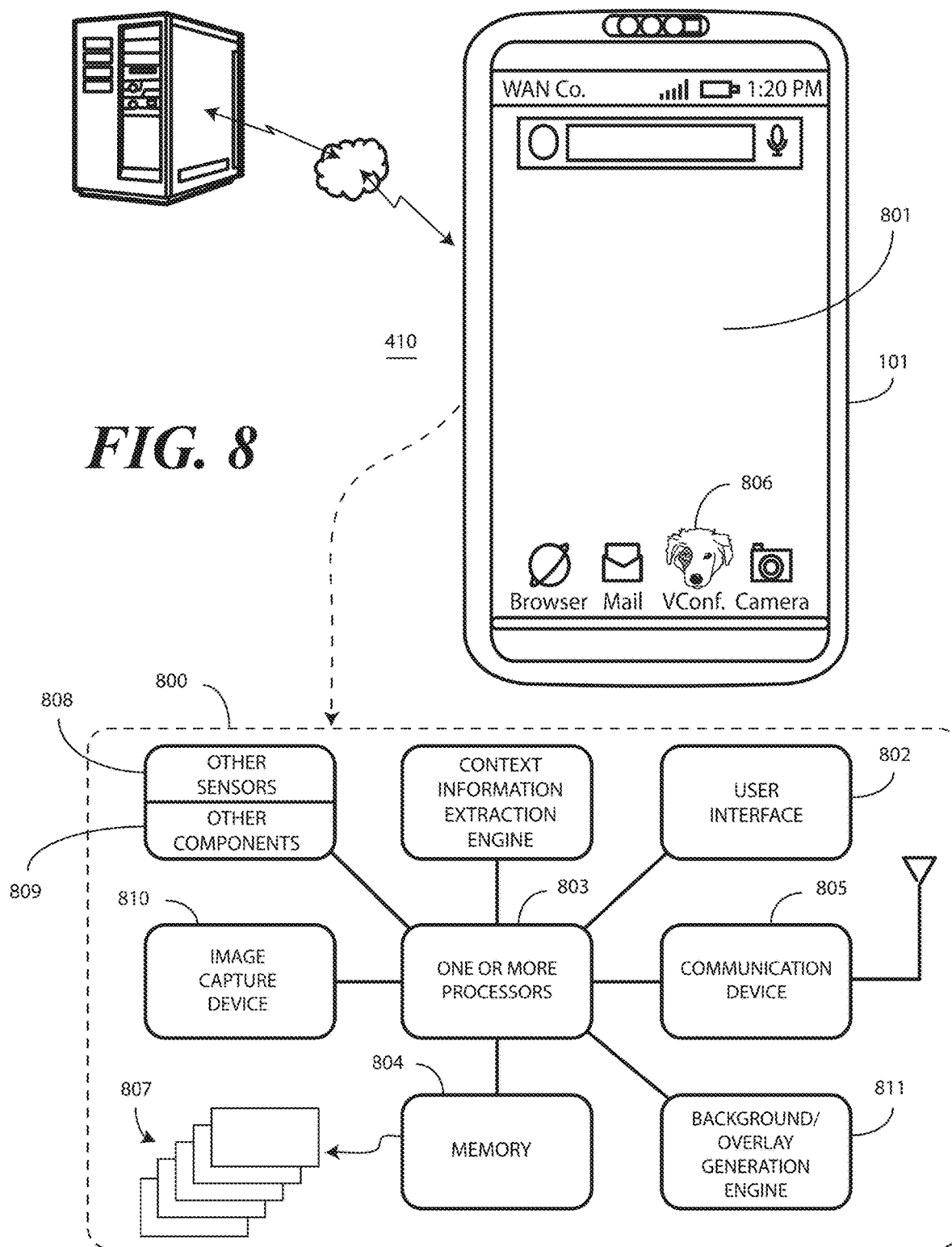
FIG. 8 illustrates one explanatory conferencing system terminal device in accordance with one or more embodiments of the disclosure.

Turning now to FIG. 8, illustrated therein is one explanatory conferencing system terminal device 101. The conferencing system terminal device 101 of FIG. 9 is a portable electronic device. For illustrative purposes, the conferencing system terminal device 101 is shown as a smartphone. However, the conferencing system terminal device 101 could be any number of other devices as well, including tablet computers, desktop computers, notebook computers, and so forth. Still other types of conferencing system terminal devices can be configured in accordance with one or more embodiments of the disclosure as will be readily appreciated by those of ordinary skill in the art having the benefit of this disclosure.

This illustrative conferencing system terminal device 101 includes a display 801, which may optionally be touch-sensitive. In one embodiment where the display 801 is touch-sensitive, the display 801 can serve as a primary user interface 802 of the conferencing system terminal device 101. Users can deliver user input to the display 801 of such an embodiment by delivering touch input from a finger, stylus, or other objects disposed proximately with the display 801.

In one embodiment, the display 801 is configured as an active-matrix organic light emitting diode (AMOLED) display. However, it should be noted that other types of displays, including liquid crystal displays, would be obvious to those of ordinary skill in the art having the benefit of this disclosure. Where the conferencing system terminal device 101 is configured with a keyboard and/or mouse, such as when the conferencing system terminal device 101 is configured as a computer, the keyboard and/or mouse can serve as the primary user interface 802.

A block diagram schematic 800 of the conferencing system terminal device 101 is also shown in FIG. 8. The block diagram schematic 800 can be configured as a printed circuit board assembly disposed within the device housing of the conferencing system terminal device 101. Various components can be electrically coupled together by conductors or a bus disposed along one or more printed circuit boards.

In one or more embodiments, the conferencing system terminal device 101 includes one or more processors 803. In one embodiment, the one or more processors 803 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the conferencing system terminal device 101. Each of the application processor and the auxiliary processor(s) can be configured to process and execute executable software code to perform the various functions of the conferencing system terminal device 101. A storage device, such as memory 804, can optionally store the executable software code used by the one or more processors 803 during operation.

The conferencing system terminal device 101 also includes a communication device 805 that can be configured for wired or wireless communication with one or more other devices or networks. The networks can include a wide area network, a local area network, and/or personal area network. The communication device 805 may also utilize wireless technology for communication, such as, but are not limited to, peer-to-peer or ad hoc communications such as HomeRF, Bluetooth and IEEE 802.11, and other forms of wireless communication such as infrared technology. The communication device 805 can include wireless communication circuitry, one of a receiver, a transmitter, or transceiver, and one or more antennas.

In one embodiment, the one or more processors 803 can be responsible for performing the primary functions of the conferencing system terminal device 101. For example, in one embodiment the one or more processors 803 comprise one or more circuits operable with one or more user interface devices, which can include the display 801, to engage in videoconferences by transmitting, receiving, and presenting images, video, or other presentation information. The executable software code used by the one or more processors 803, including that associated with a videoconference application 806, can be configured as one or more modules 807 that are operable with the one or more processors 803. Such modules 807 can store instructions, control algorithms, logic steps, and so forth.

In one embodiment, the one or more processors 803 are responsible for miming the operating system environment of the conferencing system terminal device 101. The operating system environment can include a kernel and one or more drivers, and an application service layer, and an application layer. The operating system environment can be configured as executable code operating on one or more processors or control circuits of the conferencing system terminal device 101. The application layer can be responsible for executing application service modules. The application service modules may support one or more applications or 'apps,' such as the videoconference application 806. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 803 may generate commands or execute control operations based upon user input received at the user interface 802. Moreover, the one or more processors 803 may process the received information alone or in combination with other data, such as the information stored in the memory 804.

The conferencing system terminal device 101 can include one or more sensors 808. The one or more sensors 808 may include a microphone, an earpiece speaker, and/or a second loudspeaker. The one or more other sensors 808 may also include touch actuator selection sensors, proximity sensors, a touch pad sensor, a touch screen sensor, a capacitive touch sensor, and one or more switches. Touch sensors may used to indicate whether any of the user actuation targets present on the display 801, including the audio difficulties user actuation targets described above, are being actuated. The other sensors 808 can also include audio sensors and video sensors (such as a camera).

Other components 809 operable with the one or more processors 803 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

The other components 809 can also include an audio input/processor. The audio input/processor can include hardware, executable code, and speech monitor executable code in one embodiment. The audio input/processor can include, stored in memory 804, basic speech models, trained speech models, or other modules that are used by the audio input/processor to receive and identify voice commands that are received with audio input captured by an audio input/processor, one example of which is a microphone of the one or more sensors 808. In one embodiment, the audio input/processor can include a voice recognition engine. Regardless of the specific implementation utilized in the various embodiments, the audio input/processor can access various speech models to identify speech commands in one or more embodiments.

To capture video during a videoconference, in one or more embodiments the conferencing system terminal device 101 includes an imager 810 or another image capture device. The conferencing system terminal device 101 can optionally include a depth imager as well.

In one embodiment, the imager 810 comprises a two-dimensional imager configured to receive at least one image of a person within an environment of the conferencing system terminal device 101. In one embodiment, the imager 810 comprises a two-dimensional RGB imager. In another embodiment, the imager 810 comprises an infrared imager. Other types of imagers suitable for use as the imager 810 of the conferencing system terminal device 101 will be obvious to those of ordinary skill in the art having the benefit of this disclosure.

In one or more embodiments, the conferencing system terminal device 101 includes a background/overlay engine 811. In one or more embodiments, the background/overlay engine 811 is operable with the one or more processors 803. In some embodiments, the one or more processors 803 can control the background/overlay engine 811. In other embodiments, the background/overlay engine 811 can operate independently, sensing contextual information from the one or more sensors 808 and/or receiving or identifying contextual information from remote servers and electronic devices using the communication device 805 to the one or more processors 803. The background/overlay engine 811 can receive data from the various sensors. In one or more embodiments, the one or more processors 803 are configured to perform the operations of the background/overlay engine 811.

In one or more embodiments, the background/overlay engine 811 automatically applies virtual background indicia to images of a video feed of a videoconference. In one or more embodiments, the background/overlay engine 811 automatically applies these video background indicia behind the subject of the images as a function of contextual information detected by the one or more sensors and/or received from one or more remote electronic devices during the videoconference. In one or more embodiments, the background/overlay engine 811 automatically applies these video background indicia prior to the communication device 805 transmitting the images to other conferencing system terminal devices participating in the videoconference. Thereafter, the communication device 805 can transmit the (now) contextually background modified images to other conferencing system terminal devices engaged in the videoconference. In other embodiments, the background/overlay engine 811 applies the video background indicia to images received from other conferencing system terminal devices participating in the videoconference.

Similarly, the background/overlay engine 811 can automatically apply overlay indicia generated from contextual information detected by the one or more sensors 808 and/or received from remote electronic devices using the communication device 805 to at least one videoconference feed during the videoconference. The display 801 can then present the modified videoconference feed after the overlay indicia is applied. The background/overlay engine 811 can apply an overlay generated as a function of detected or received contextual information to portions of images in the video feed depicting objects other than the subject to create contextually modified images of the subject. Alternatively, the background/overlay engine 811 can superimpose the overlay indicia atop the subject as illustrated above in FIG. 5.

The background/overlay engine 811 can be operable with the various sensors 808 to detect, infer, capture, and otherwise determine persons, actions, and other contextual information that are occurring in an environment 410 about the conferencing system terminal device 101. For example, where included one embodiment of the background/overlay engine 811 determines assessed contexts and frameworks using adjustable algorithms of context assessment employing information, data, and events. These assessments may be learned through repetitive data analysis. These assessments can be used to obtain additional contextual information when the contextual information changes in one or more embodiments. The background/overlay engine 811 can comprise an artificial neural network or other similar technology in one or more embodiments.

It is to be understood that FIG. 8 is provided for illustrative purposes only and for illustrating components of one conferencing system terminal device 101 in accordance with embodiments of the disclosure and is not intended to be a complete schematic diagram of the various components required for an electronic device. Therefore, other conferencing system terminal devices in accordance with embodiments of the disclosure may include various other components not shown in FIG. 8 or may include a combination of two or more components or a division of a particular component into two or more separate components, and still be within the scope of the present disclosure.

Turning now to FIG. 9, illustrated therein is one explanatory video conferencing system server complex 106 configured in accordance with one or more embodiments of the disclosure. An illustrative schematic block diagram 900 is also shown in FIG. 9.

As with the block diagram schematic (800) of FIG. 8, it is to be understood that the schematic block diagram 900 of FIG. 9 is provided for illustrative purposes only and for illustrating components of one explanatory server complex 106 configured in accordance with one or more embodiments of the disclosure. Accordingly, the components shown in either FIG. 8 or FIG. 9 are not intended to be complete schematic diagrams of the various components required for a particular device, as other devices configured in accordance with embodiments of the disclosure may include various other components not shown in FIG. 8 or FIG. 9. Alternatively, other server complexes or conferencing system terminal devices configured in accordance with embodiments of the disclosure or may include a combination of two or more components or a division of a particular component into two or more separate components, and still be within the scope of the present disclosure.

In one or more embodiments the conferencing system server complex 106 can be configured with performing processor-intensive methods, operations, steps, functions, or procedures associated with the presentation, actuation, and management of dynamic, automatic, and real time video background indicia and overlay indicia during a videoconference. Illustrating by example, the conferencing system server complex 106 can be configured to receive one or more images 901 in a video feed of a videoconference across a network 105. A contextual information monitoring engine 902 can then monitor contextual information occurring at locations where various conferencing system terminal devices are located. One or more processors 903 of the conferencing system server complex 106 can then generate overlays or other overlay indicia as a function of contextual information associated with a participant of the videoconference identified by the contextual information monitoring engine 902. The one or more processors 903 can then apply the overlay or overlay indicia to a videoconference feed to create a modified videoconference feed that is delivered as videoconference content to the conferencing system terminal devices participating in the videoconference.

Similarly, the one or more processors 903 can generate a virtual background or other video background indicia as a function of contextual information identified by the contextual information monitoring engine 902 for one or more videoconference feeds received from one or more conferencing system terminal device participating in a videoconference. The one or more processors 903 can then apply the virtual background or video background indicia to the one or more videoconference feeds to create one or more modified background videoconference feeds. A communication device 904 of the conferencing system server complex 106 can then deliver the one or more modified background videoconference feeds as videoconference content to the conferencing system terminal devices engaged in the videoconference.

In one or more embodiments, the one or more processors 903 use a background/overlay engine 811 (previously described) to generate the video background indicia and overlay indicia in real time as a videoconference associated with the content being modified is occurring. Multiple video background indicia and/or overlay indicia can be generated so that, when applied to various videoconference feeds, each overlay indicia or each video background indicia are different. This allows each overlay indicia or video background indicia to be customized to a particular participant's contextual information.

In one or more embodiments, the conferencing system server complex 106 includes one or more memory devices 905, and one or more user interface devices 906, e.g., a display, a keyboard, a mouse, audio input devices, audio output devices, and alternate visual output devices. The conferencing system server complex 106 also includes a communication device 905. These components can be operatively coupled together such that, for example, the one or more processors 904 are operable with the one or more memory devices 905, the one or more user interface devices 906, the communication device 904, and/or other components 907 of the conferencing system server complex 106 in one or more embodiments.

The one or more processors 903 can include a microprocessor, a group of processing components, one or more ASICs, programmable logic, or other type of processing device. The one or more processors 903 can be configured to process and execute executable software code to perform the various functions of the conferencing system server complex 106.

The one or more memory devices 905 can optionally store the executable software code used by the one or more processors 903 in carrying out the operations of the videoconference system. The one or more memory devices 905 may include either or both of static and dynamic memory components. The one or more memory devices 905 can store both embedded software code and user data.

In one or more embodiments, the one or more processors 903 can define one or more process engines. For instance, the software code stored within the one or more memory devices 905 can embody program instructions and methods to operate the various functions of the conferencing system server complex 106, and also to execute software or firmware applications and modules such as the background/overlay engine 811 and a video conferencing engine 908. Where included, the process engines can be configured to perform video background indicia and overlay indicia generation and application operations as previously described.

Figure 10:
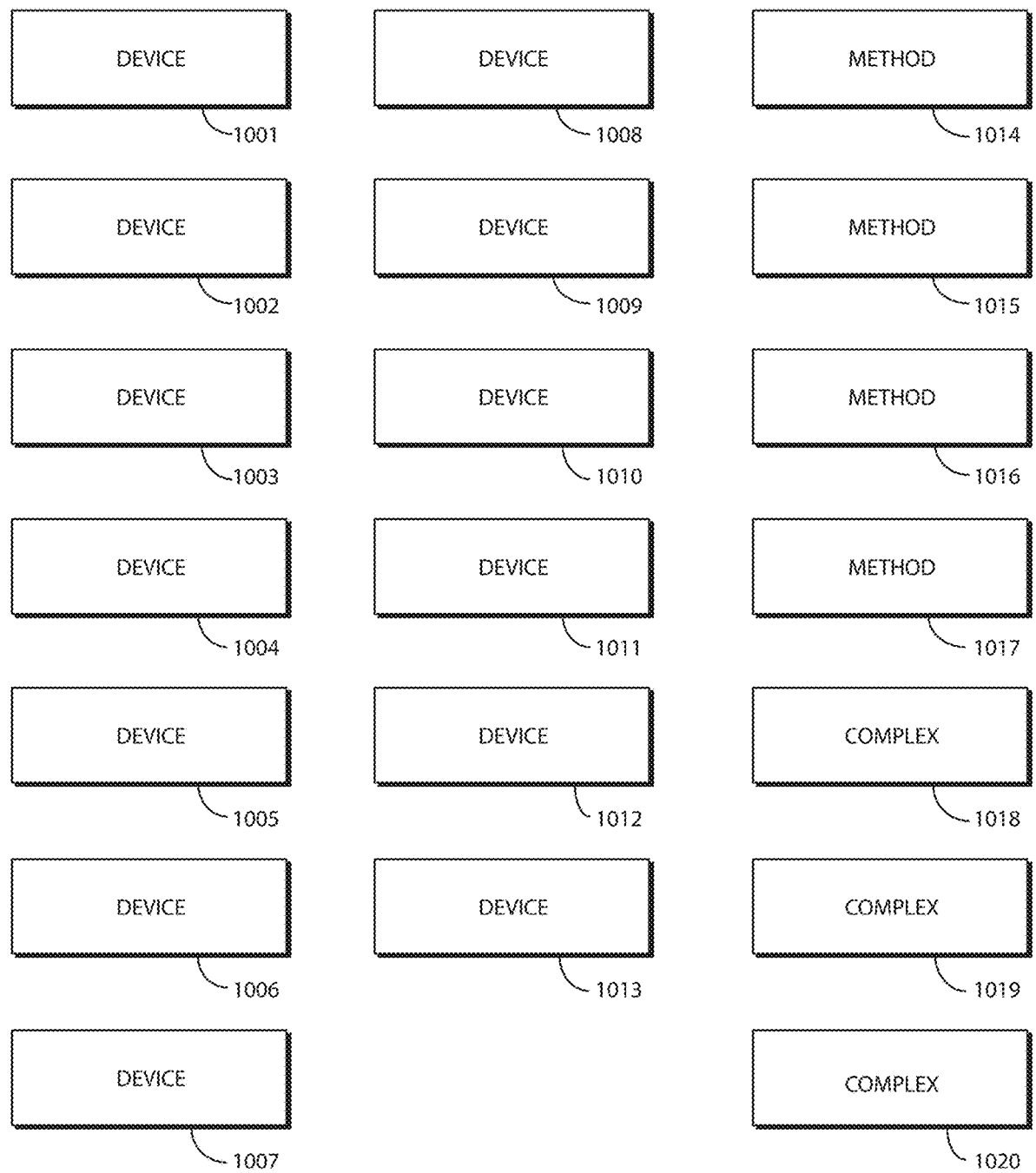
FIG. 10 illustrates various embodiments of the disclosure.
Figure 11:
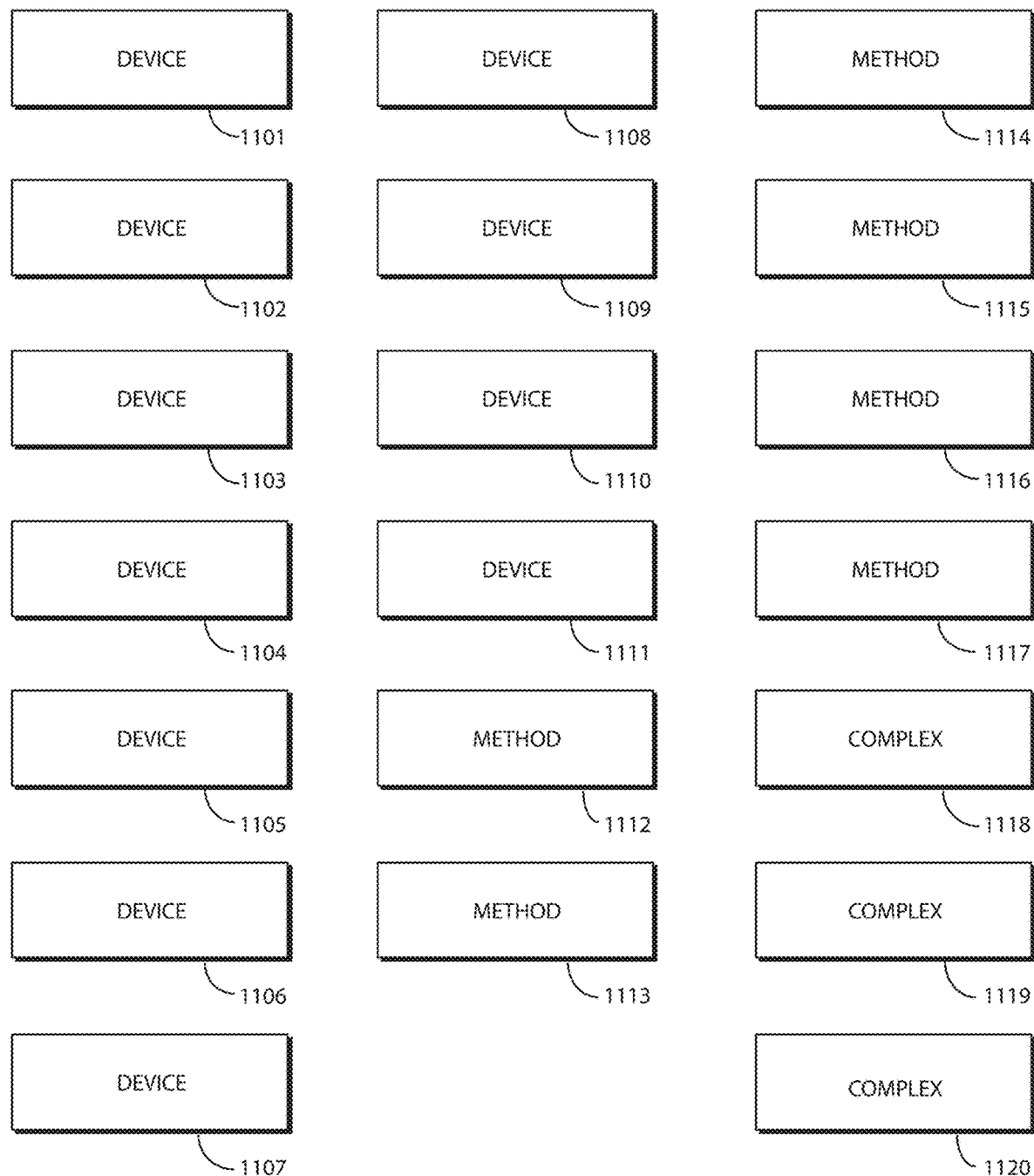
FIG. 11 illustrates various other embodiments of the disclosure.

Turning now to FIGS. 10-11, illustrated therein are various embodiments of the disclosure. The embodiments of FIGS. 10-11 are shown as labeled boxes in FIGS. 10-11 due to the fact that the individual components of these embodiments have been illustrated in detail in FIGS. 1-9, which precede FIGS. 10-11. Accordingly, since these items have previously been illustrated and described, their repeated illustration is no longer essential for a proper understanding of these embodiments. Thus, the embodiments are shown as labeled boxes.

At 1001, a conferencing system terminal device comprises an image capture device capturing images of a subject during a videoconference occurring across a network. At 1001, the conferencing system terminal device comprises a communication device transmitting the images to at least one remote electronic device engaged in the videoconference.

At 1001, the conferencing system terminal device comprises one or more sensors and one or more processors. At 1001, the one or more processors automatically apply virtual background indicia in the images behind the subject as a function of contextual information detected by the one or more sensors. At 1001, the one or more processors apply the video background indicia during the videoconference and prior to the communication device transmitting the images to the at least one remote electronic device engaged in the videoconference.

At 1002, the video background indicia of 1001 are generated in real time as a function of the contextual information detected by the one or more sensors. At 1003, the contextual information of 1002 comprises clothes worn by the subject. At 1004, the video background indicia of 1002 obscures portions of the images depicting objects other than the subject.

At 1005, the contextual information of 1004 comprises a color palette associated with the portions of the images depicting objects other than the subject. At 1006, the contextual information of 1004 comprises shapes detected in the portions of the images depicting objects other than the subject. At 1007, the one or more processors of 1002 change the virtual background indicia when the contextual information changes.

At 1008, the communication device of 1001 further receives contextual information from one or more remote electronic devices. At 1008, the virtual background indicia are generated in real time as a function of the contextual information received from the one or more remote electronic devices.

At 1009, the contextual information of 1008 comprises time of day information. At 1010, the contextual information of 1008 comprises location information relating to a location of the conferencing system terminal device. At 1011, the contextual information of 1008 comprises weather information in an environment of the conferencing system terminal device. At 1012, the contextual information of 1008 comprises event information.

At 1013, the communication device of 1001 further receives contextual information from one or more remote electronic devices. At 1013, the virtual background indicia are received from the one or more remote electronic devices.

At 1014, a method in a videoconference s comprises identifying, by one or more processors of a conferencing system terminal device, contextual information occurring during a videoconference. At 1014, the method comprises capturing, with an image capture device, images of a subject engaged in the videoconference.

At 1014, the method comprises applying a virtual background generated as a function of the contextual information to portions of the images depicting objects other than the subject to create contextually background modified images of the subject. At 1014, the method comprises transmitting, with a communication device operable with the one or more processors, the contextually background modified images of the subject a network to another conferencing system terminal device engaged in the videoconference.

At 1015, the method of 1014 further comprises updating, by the one or more processors, the virtual background as the contextual information changes. At 1016, the method of 1015 further comprises detecting, by one or more sensors, the contextual information from an environment. At 1017, the method of 1015 further comprises receiving, with the communication device across the network, the contextual information from a server.

At 1018, a conferencing system server complex comprises a video conferencing engine delivering video conferencing content to a plurality of conferencing system terminal devices during a videoconference. At 1018, the conferencing system server complex comprises a contextual information monitoring engine.

At 1018, the conferencing system server complex comprises one or more processors generating a virtual background as a function of contextual information identified by the contextual information monitoring engine for one or more videoconference feeds received from one or more conferencing system terminal devices of the plurality of conferencing system terminal devices. At 1018, the conferencing system server complex applies the virtual background to the one or more videoconference feeds to create to create one or more modified background videoconference feeds. At 1018, the conferencing system server complex delivers the one or more modified background videoconference feeds in the video conferencing content to the plurality of conferencing system terminal devices.

At 1019, one or more processors of 1018 generate the virtual background in real time as a videoconference associated with the video conferencing content is occurring. At 1020, the one or more processors of 1018 generate a plurality of virtual backgrounds as a function of the contextual information for each videoconference feed received from the plurality if conferencing system terminal devices, wherein each virtual background is different from each other virtual background.

Turning now to FIG. 11, at 1101 a conferencing system terminal device comprises a communication device receiving one or more videoconference feeds depicting one or more subjects engaged in a videoconference from one or more remote electronic devices. At 1101, the conferencing system terminal device comprises a contextual information extraction engine extracting contextual information of the videoconference from the one or more videoconference feeds.

At 1101, the conferencing system terminal device comprises one or more processors automatically applying overlay indicia generated from the contextual information to at least one videoconference feed during the videoconference. At 1101, the conferencing system terminal device comprises a display presenting the at least one videoconference feed after the overlay indicia is applied.

At 1102, the one or more videoconference feeds of 1101 each have audio content associated therewith. At 1102, the contextual information is extracted from the audio content.

At 1103, the one or more processors of 1102 transcribe the audio content to create transcribed audio content. At 1103, the one or more processors cause the display to present portions of the transcribed audio content comprising the contextual information used to generate the overlay indicia.

At 1104, the one or more processors of 1103 cause the display to present the portions of the transcribed audio content comprising the contextual information concurrently with presentation of the overlay indicia. At 1105, the one or more processors of 1104 further cause the display to present a visual identifier distinguishing the contextual information from other portions of the transcribed audio content.

At 1106, the one or more processors of 1104 further extract one or more questions from the transcribed audio content. At 1104, the one or more processors present one or more answers to the one or more questions in the overlay indicia.

At 1107, the one or more processors of 1106 cause the communication device to query a remote server across a network to obtain the one or more answers. At 1108, the one or more processors of 1107 present a question of the one or more questions and an answer of the one or more answers simultaneously in the overlay indicia.

At 1109, the contextual information of 1102 comprises congratulatory wishes to a participant of the videoconference. At 1110, the contextual information of 1102 comprises weather information corresponding to an environment of at least one remote electronic device of the one or more remote electronic devices. At 1111, the overlay indicia of 1110 comprise one or more of a depiction of a temperature from the environment, a depiction of a season occurring within the environment, or a depiction of precipitation, or a lack thereof, occurring within the environment.

At 1112, a method in a videoconference system comprises identifying, by one or more processors of a conferencing system terminal device, contextual information occurring during a videoconference and associated with a subject engaged in the videoconference. At 1112, the method comprises receiving, with a communication device, images of the subject engaged in the videoconference.

At 1112, the method comprises applying, with the one or more processors, an overlay generated as a function of the contextual information to portions of the images depicting objects other than the subject to create contextually modified images of the subject. At 1112, the method comprises presenting, with a display operable with the one or more processors, the contextually modified images of the subject.

At 1113, the method of 1112 further comprises applying the overlay only temporarily in response to the one or more processors identifying the contextual information associated with the subject engaged in the videoconference. At 1114, the method of 1112 further comprises updating, by the one or more processors, the overlay as the contextual information changes.

At 1115, the method of 1112 comprises applying the overlay to the portions of the images by superimposing at least some of the overlay atop the subject in the images. At 1116, the method of 1112 further comprises transcribing audio content received from other subjects engaged in the videoconference and containing the contextual information associated with the subject engaged in the videoconference as transcribed audio content and presenting portions of the transcribed audio content comprising the contextual information on the display. At 1117, the method of 1116 comprises presenting a graphical indicator on the display identifying the contextual information in the portions of the transcribed audio content.

At 1118, a conferencing system server complex comprises a video conferencing engine delivering video conferencing content to a plurality of conferencing system terminal devices during a videoconference. At 1118, the conferencing system server complex comprises a contextual information monitoring engine.

At 1118, the conferencing system server complex comprises one or more processors generating an overlay as a function of contextual information associated with a participant of the videoconference and identified by the contextual information monitoring engine. At 1118, the one or more processors apply the overlay to a videoconference feed the participant to create to create a modified videoconference feed. At 1118, the one or more processors deliver the modified videoconference feed in the video conferencing content to the plurality of conferencing system terminal devices.

At 1119, the one or more processors of 1118 generate the overlay in real time as the videoconference associated is occurring. At 1120, the one or more processors of 1118 generate a plurality of overlays as a function of the contextual information for each videoconference feed received from the plurality if conferencing system terminal devices, wherein each overlay is different from each other overlay.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A conferencing system terminal device, comprising:
 a communication device;
 a contextual information extraction engine;
 one or more processors automatically applying overlay indicia generated from contextual information extracted from one or more videoconference feeds received by the communication device and depicting one or more subjects engaged in a videoconference from one or more remote electronic devices to at least one videoconference feed during the videoconference; and
 a display presenting the at least one videoconference feed after the overlay indicia is applied;
 the one or more processors further extracting one or more questions from audio content associated with the one or more videoconference feeds and presenting a question of the one or more questions and an answer of the question simultaneously in the overlay indicia.

2. The conferencing system terminal device of claim 1, wherein the contextual information is extracted from the audio content.

3. The conferencing system terminal device of claim 2, the one or more processors transcribing the audio content to create transcribed audio content and causing the display to present portions of the transcribed audio content comprising the contextual information used to generate the overlay indicia.

4. The conferencing system terminal device of claim 3, the one or more processors causing the display to present the portions of the transcribed audio content comprising the contextual information concurrently with presentation of the overlay indicia.

5. The conferencing system terminal device of claim 4, the one or more processors further causing the display to present a visual identifier distinguishing the contextual information from other portions of the transcribed audio content.

6. The conferencing system terminal device of claim 4, answer selected from one or more answers to the one or more questions in the overlay indicia.

7. The conferencing system terminal device of claim 6, the one or more processors causing the communication device to query a remote server across a network to obtain the one or more answers.

8. The conferencing system terminal device of claim 7, question comprising a weather question.

9. The conferencing system terminal device of claim 2, the contextual information comprising congratulatory wishes to a participant of the videoconference.

10. The conferencing system terminal device of claim 2, the contextual information comprising weather information corresponding to an environment of at least one remote electronic device of the one or more remote electronic devices.

11. The conferencing system terminal device of claim 10, the overlay indicia comprising one or more of a depiction of a temperature from the environment, a depiction of a season occurring within the environment, or a depiction of precipitation, or a lack thereof, occurring within the environment.

12. A method in a video conferencing system, the method comprising:
 identifying, by one or more processors of a conferencing system terminal device, contextual information occurring during a videoconference and associated with a subject engaged in the videoconference;
 receiving, with a communication device, images of the subject engaged in the videoconference;
 applying, with the one or more processors, an overlay generated as a function of the contextual information to portions of the images depicting objects other than the subject to create contextually modified images of the subject; and
 presenting, with a display operable with the one or more processors, the contextually modified images of the subject;
 wherein the overlay comprises a presentation of a question extracted from the contextual information presented simultaneously with an answer to the question.

13. The method of claim 12, further comprising applying the overlay only temporarily in response to the one or more processors identifying the contextual information associated with the subject engaged in the videoconference.

14. The method of claim 12, further comprising updating, by the one or more processors, the overlay as the contextual information changes.

15. The method of claim 12, further comprising applying the overlay to the portions of the images by superimposing at least some of the overlay atop the subject in the images.

16. The method of claim 12, further comprising transcribing audio content received from other subjects engaged in the videoconference and containing the contextual information associated with the subject engaged in the videoconference as transcribed audio content and presenting portions of the transcribed audio content comprising the contextual information on the display.

17. The method of claim 16, further comprising presenting a graphical indicator on the display identifying the contextual information in the portions of the transcribed audio content.

18. A conferencing system server complex, comprising:
a video conferencing engine;
a contextual information monitoring engine; and
one or more processors generating an overlay as a function of contextual information associated with a participant of a videoconference and identified by the contextual information monitoring engine, applying the overlay to a videoconference feed around the participant to create to create a modified videoconference feed, and delivering the modified videoconference feed in video conferencing content delivered to a plurality of conferencing system terminal devices during a videoconference;
the overlay comprising a depiction of a question extracted from the contextual information presented simultaneously with another depiction of an answer to the question.

19. The conferencing system server complex of claim 18, the one or more processors generating the overlay in real time as the videoconference associated is occurring.

20. The conferencing system server complex of claim 18, the one or more processors generating a plurality of overlays as a function of the contextual information for each videoconference feed received from the plurality if conferencing system terminal devices, wherein each overlay is different from each other overlay.

* * * * *